(12) United States Patent
Frazier

(10) Patent No.: US 8,700,650 B2
(45) Date of Patent: Apr. 15, 2014

(54) SEARCH RESULTS COMPARISON METHODS AND SYSTEMS

(75) Inventor: Kristopher T. Frazier, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

(21) Appl. No.: 13/168,152

(22) Filed: Jun. 24, 2011

(65) Prior Publication Data
US 2012/0330937 A1   Dec. 27, 2012

(51) Int. Cl.
*G06F 17/30* (2006.01)
(52) U.S. Cl.
CPC ............................ *G06F 17/30017* (2013.01)
USPC .......................................................... 707/758
(58) Field of Classification Search
USPC .................. 707/723, 736, 748, 749, 752, 758
See application file for complete search history.

(56) References Cited

U.S. PATENT DOCUMENTS

| | | | |
|---|---|---|---|
| 7,299,222 B1* | 11/2007 | Hogan et al. | 1/1 |
| 7,555,477 B2* | 6/2009 | Bayley et al. | 1/1 |
| 7,603,349 B1* | 10/2009 | Kraft et al. | 1/1 |
| 2006/0085395 A1* | 4/2006 | Cradick et al. | 707/3 |
| 2006/0248060 A1* | 11/2006 | Silverberg et al. | 707/3 |
| 2007/0276820 A1* | 11/2007 | Iqbal | 707/4 |
| 2008/0082512 A1* | 4/2008 | Hogan et al. | 707/3 |

OTHER PUBLICATIONS

Heimonen et al., Visualizing Query Occurrence in Search Result Lists, Jul. 6-8, 2005, IEEE, 877-882.*

* cited by examiner

*Primary Examiner* — Jean B Fleurantin

(57) ABSTRACT

An exemplary method includes a search results comparison system receiving data representative of a first search term and a second search term, identifying a group of search results that are each related to the first and second search terms, determining a degree of relatedness of each of the search results to the first search term and a degree of relatedness of each of the search results to the second search term, and presenting a set of one or more search result icons representative of one or more of the search results in between a first search term icon representative of the first search term and a second search term icon representative of the second search term. Corresponding methods and systems are also disclosed.

23 Claims, 19 Drawing Sheets

SEARCH RESULTS COMPARISON METHODS AND SYSTEMS

BACKGROUND INFORMATION

Keyword searches performed by conventional search applications (e.g., Internet search engines, program guide applications, desktop search applications, etc.) often produce a plethora of results, many of which are of little or no interest to a user. Consequently, the user may attempt to filter the results by combining additional keywords with the originally input keywords until a satisfactory list of results is generated.

Unfortunately, it is often difficult for a user to ascertain how related each search result is to each of the various keywords used to perform a search. For example, if first and second keywords are used to perform a particular search, it is often difficult for a user to know which of the results are more related to the first keyword, which of the results are more related to the second keyword, and which of the results share the most attributes with both the first and second keywords. Consequently, the user may waste time and resources combing through the results in order to identify results that are of most interest to the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
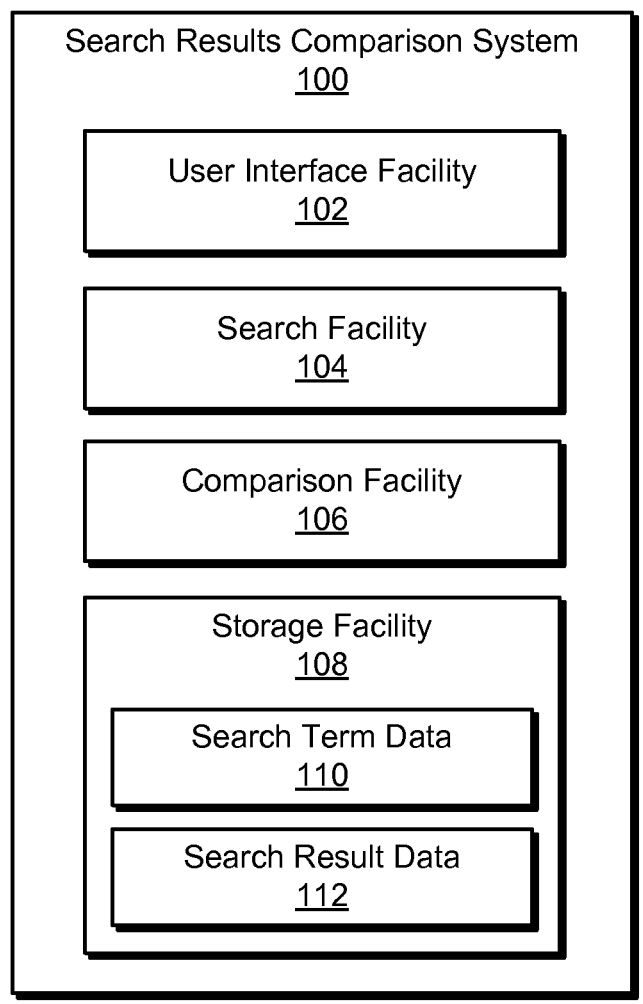
FIG. 1 illustrates an exemplary search results comparison system according to principles described herein.

Search results comparison methods and systems are described herein. As will be described in more detail below, the methods and systems described herein may generate search results based on multiple search terms and then graphically portray the search results in a manner that allows a user to visually compare a degree of relatedness of each of the search results to each of the search terms. In some examples, the graphically portrayed search results are elastic in that they may be graphically expanded by the user in order to dynamically "bring in" more related search results or graphically contracted by the user in order to dynamically narrow the search results. In this manner, the user may quickly identify search results that may be of interest to the user, discover new content (e.g., music, videos, television programs, etc.), and/or otherwise benefit from comparing search terms.

To illustrate, a search results comparison system may receive data representative of a first search term and a second search term by way of a graphical user interface ("GUI"), identify a group of search results that are each related to the first and second search terms, determine a degree of relatedness of each of the search results to the first search term and a degree of relatedness of each of the search results to the second search term, and present a set of one or more search result icons representative of one or more search results included in the group of search results in between (e.g., in line with) a first search term icon representative of the first search term and a second search term icon representative of the second search term. As will be described in more detail below, a position of each of the one or more search result icons relative to the first and second search term icons may be based on the degrees of relatedness of each of the one or more search results to the first and second search terms.

The methods and systems described herein may be utilized in various contexts. For example, a user of a set-top box device may utilize the methods and systems described herein to compare search results related to two or more different television programs (e.g., within a program guide context). To illustrate, the user may enter the names of two different television programs (e.g., "Seinfeld" and "Friends") as search terms. The methods and systems described herein may identify search results (e.g., other television programs) related to both "Seinfeld" and "Friends" and present search result icons (e.g., cover art) representative of the identified search results within a GUI (e.g., within a program guide interface). The user may browse through the search results to discover content (e.g., other television programs) that the user is likely to be interested in, readily identify a particular search result that is most similar to both television programs, and/or readily identify a particular search result that is more similar to one television program compared to the other television program.

Additionally or alternatively, a user of an Internet search engine may utilize the methods and systems described herein to compare search results related to two or more Internet search terms. To illustrate, the user may enter the names of two different actors (e.g., "Bruce Willis" and "Demi Moore") as search terms. Search results related to both search terms (e.g., websites that mention both actors, movies associated with both actors, etc.) may be identified and presented within a GUI (e.g., an Internet browser) in the form of one or more search result icons. The search result icons may be positioned based on the degrees of relatedness of each of the search results to the two actors so that a user may readily see how related each search result is to the two actors. The methods and systems described herein may be utilized within any other search context as may serve a particular implementation.

FIG. 1 illustrates an exemplary search results comparison system 100 (or simply "system 100"). As will be described in more detail below, system 100 may be configured to facilitate visual comparison of search results relative to search terms used to generate the search results.

As shown, system 100 may include a user interface facility 102, a search facility 104, a comparison facility 106, and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

User interface facility 102 may be configured to provide one or more graphical user interfaces ("GUIs") through which one or more search functions, options, features, and/or tools may be provided to a user and through which user input may be received. In some examples, user interface facility 102 may direct an access device (e.g., a set-top box device, a personal computer, etc.) to display one or more GUIs on a display screen of a display device communicatively coupled to or a part of the access device. Exemplary GUIs that may be provided by user interface facility 102 will be described in more detail below.

Search facility 104 may be configured to perform one or more search operations. For example, search facility may receive data representative of various search terms by way of a GUI provided by user interface facility 102 and identify various search results that are related to one or more of the search terms. As used herein, a "search term" may include any type of data that may be used to perform one or more searches. For example, a search term may include one or more keywords, one or more metadata values selected by a user, and/or any other data type as may serve a particular implementation. To illustrate, a search term may be representative of a particular content instance (e.g., a media content instance (e.g., a television program, an on-demand media program, a pay-per-view media program, an advertisement, a video, a movie, a song, etc.), a document, a website, a webpage, an image, etc.), a particular person (e.g., actor, director, etc.), a file, and/or any other type of content as may serve a particular implementation.

The search results identified by search facility 104 may include or be representative of any type of information or content as may serve a particular implementation. For example, the search results may include data representative of one or more content instances, files, people, and/or any other type of information or content as may serve a particular implementation.

Search facility 104 may search any suitable location to identify search results related to one or more search terms. For example, search facility 104 may perform a local search of a hard drive associated with a computing device used by a user, a remote search of one or more databases, servers, websites, online multimedia stores, and/or other locations connected by way of a network to the computing device used by the user, and/or any other suitable location as may serve a particular implementation.

Comparison facility 106 may be configured to perform one or more comparison operations with regard to search results identified by search facility 104. For example, first and second search terms may be used to identify a group of search results. Comparison facility 106 may determine a degree of relatedness of each of the search results to the first search term and a degree of relatedness of each of the search results to the second search term. Comparison facility 106 may then graphically portray the search results in a manner that allows a user to visually compare a degree of relatedness of one or more of the search results to both the first and second search terms. For example, comparison facility 106 may present (e.g., direct an access device to concurrently display) a set of one or more search result icons representative of one or more of the search results in between (e.g., in line with) a first search term icon representative of the first search term and a second search term icon representative of the second search term. As will be described in more detail below, a position of each of the one or more search result icons relative to the first and second search term icons may be based on the degrees of relatedness of each of the one or more search results to the first and second search terms.

Comparison facility 106 may determine a degree of relatedness of a particular search result to the first and second search terms in any suitable manner. For example, the degree of relatedness of a particular search result to a particular search term may be based on a number of attributes that the search result has in common with the search term. Such attributes may include, but are not limited to, one or more metadata values shared by content instances represented by the search result and the search term, word counts (e.g., how many times the search term is found within a webpage, document, or other type of media content instance represented by the search result), and/or any other type of attribute as may serve a particular implementation.

As used herein, the term "metadata value" refers to any electronic data descriptive of a content instance. For example, a metadata value associated with a content instance (e.g., a movie or song) may include data representative of a title of the content instance, a name of one or more people associated with the content instance (e.g., actors, directors, producers, creators, etc.), a rating of the content instance (e.g., user ratings, critic ratings, etc.), a synopsis of the content instance, a setting of the content instance, a theme of the content instance, a format of the content instance, a genre of the content instance, a length of the content instance, one or more graphics associated with the content instance (e.g., cover art), an album associated with the content instance, a play count associated with the content instance, a quality (e.g., resolution) of the content instance, a size of the content instance, a time or date associated with the content instance (e.g., time or date of production, time or date of release, etc.), one or more tags associated with the content instance, a bit-rate of the content instance, a compression amount of the content instance, a codec associated with the content instance, and/or any other information corresponding to the content instance as may serve a particular implementation.

In some examples, the one or more attributes upon which the degree of relatedness of a particular search result to a particular search term is based may be specified by a user. For example, a user may select a particular attribute as the sole basis of comparison for a search result to a search term. Additionally or alternatively, one or more of the attributes upon which the degree of relatedness of a particular search result to a particular search term is based may be automatically determined by comparison facility 106.

As mentioned, a position of each of the one or more search result icons representative of one or more search results relative to the first and second search term icons representative of the first and second search terms, respectively, may be based on the degrees of relatedness of each of the one or more search results to the first and second search terms. For example, a first search result represented by a first search result icon may have more attributes in common with the first search term than with the second search term and a second search result represented by a second search result icon may have more attributes in common with the second search term than with the first search term. In this case, as will be illustrated in more detail below, comparison facility 106 may position the first search result icon relatively closer than the second search result icon to the first search term icon.

In some examples, a set of one or more search result icons that may be presented within a GUI by comparison facility 106 may be elastic in that it may be expanded and/or contracted by a user to either "bring in" one or more additional search result icons or to remove one or more search result icons from being presented within the GUI. For example, a particular set of search result icons representative of search results related to first and second search terms may be initially presented in between first and second search term icons representative of the first and second search terms. Subsequently, comparison facility 106 may receive data representative of a user request to expand the set of search result icons. In response, comparison facility 106 may present one or more additional search result icons representative of one or more additional search results related to the first and second search terms together with (i.e., concurrently with) the already presented search result icons in between the first and second search term icons. Alternatively, comparison facility 106 may receive data representative of a user request to contract the set of search result icons. In response, comparison facility 106 may remove one or more of the search result icons from being presented in between the first and second search term icons. Exemplary manners in which a request to either expand or contract a set of one or more search result icons may be provided to comparison facility 106 will be illustrated below.

In some examples, comparison facility 106 may dynamically modify and/or update the number of search result icons and the search term icons presented within a GUI in response to receiving user input representative of one or more additional search terms. For example, a first set of search result icons representative of search results related to first and second search terms may be initially presented in a GUI in between first and second search term icons representative of the first and second search terms. Subsequently, search facility 104 may receive data representative of a third search term by way of the GUI. In response, search facility 104 may identify a second group of search results that are each related to the second and third search terms. Comparison facility 106 may then present, within the GUI and together with the first set of search result icons, a second set of search result icons representative of search results included in the second group of search results in between the second search term icon and a third search term icon representative of the third search term. Various examples of presenting the second set of search result icons will be described in more detail below.

In some examples, comparison facility 106 may graphically portray search results related to three or more search terms within an area defined by search term icons representative of the three or more search terms. For example, search facility 104 may receive data representative of three or more search terms by way of a GUI. Comparison facility 106 may present, within the GUI, a plurality of search term icons each representative of one of the three or more search terms and a plurality of search result icons representative of a plurality of search results related to each of the three or more search terms within an area of a polygon defined by a plurality of substantially linear lines interconnecting the plurality of search term icons. Examples of this will be described in more detail below.

In some examples, a user may desire to reuse a particular set of search terms. To this end, comparison facility 106 may be further configured to associate various search terms provided by the user with a particular search session and then save the search season for subsequent access by the user.

Storage facility 108 may be configured to maintain search term data 110 representative of one or more search terms and search result data 112 representative of one or more search results. Storage facility 108 may be configured to maintain additional or alternative data as may serve a particular implementation.

Figure 2:
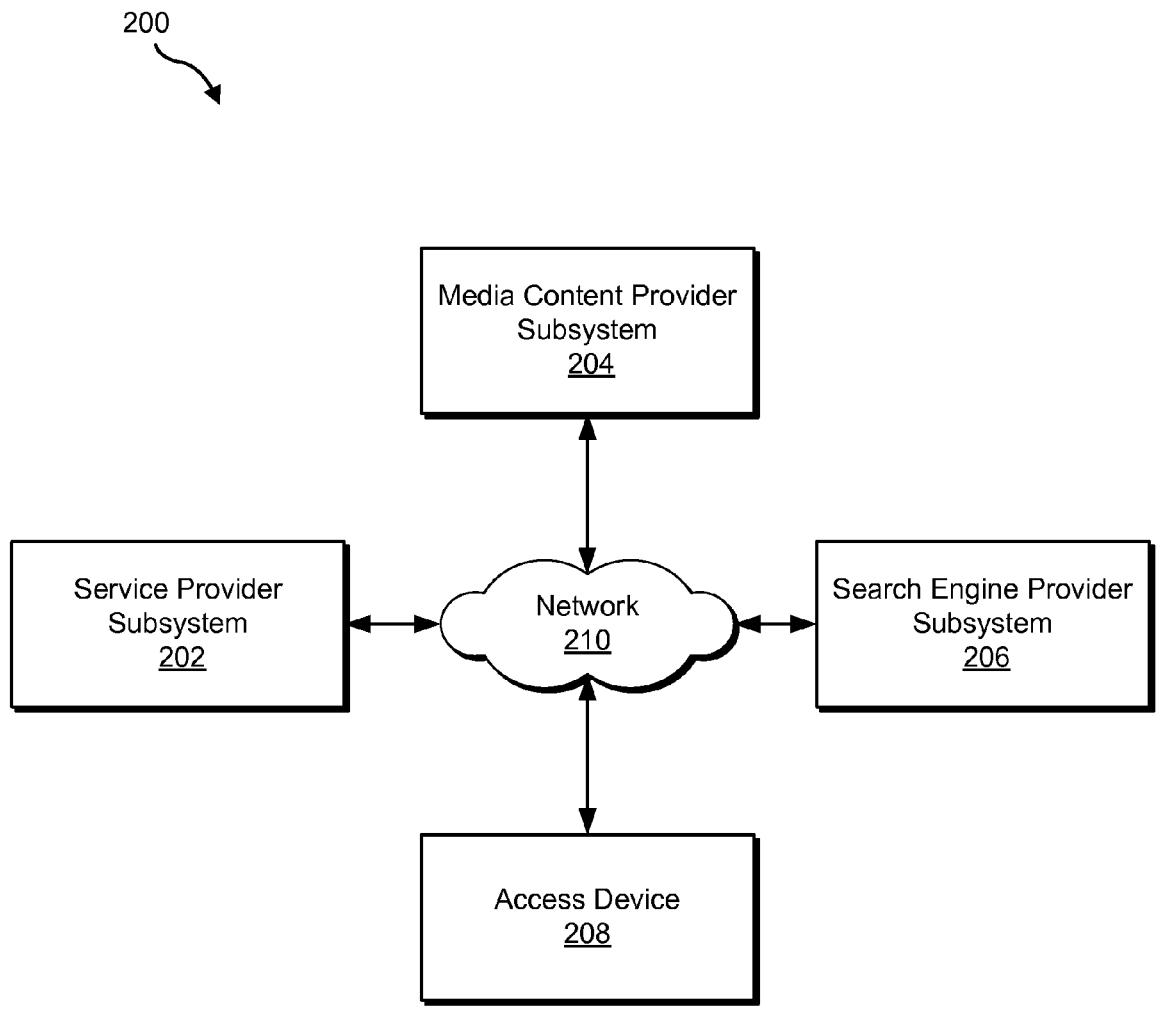
FIG. 2 illustrates an exemplary implementation of the system of FIG. 1 according to principles described herein.

FIG. 2 illustrates an exemplary implementation 200 of system 100 wherein a service provider subsystem 202, a media content provider subsystem 204, and a search engine provider subsystem 206 are communicatively coupled to an access device 208 by way of a network 210. As will be described in more detail below, user interface facility 102, search facility 104, comparison facility 106, and storage facility 108 may each be implemented by one or more of service provider subsystem 202, media content provider subsystem 204, search engine provider subsystem 206, and access device 208.

Service provider subsystem 202 may be associated with a service provider (e.g., a subscriber television service provider, an Internet service provider, etc.) and may be configured to provide one or more content services (e.g., television services, video-on-demand services, Internet services, etc.) to access device 208. For example, service provider subsystem 202 may be configured to manage (e.g., maintain, process, distribute, and/or generate) media content (e.g., media content programs, advertisements, etc.) configured to be presented to one or more users of access device 208.

Media content provider subsystem 204 may be associated with any suitable media content provider (e.g., ESPN, a particular user, etc.) and may be configured to provide media content for presentation to one or more users of access device 208. In some examples, the media content may be provided to access device 208 by way of service provider subsystem 202.

Search engine provider subsystem 206 may be associated with any suitable search engine provider (e.g., Google, etc.) and may be configured to facilitate one or more Internet searches, local (e.g., desktop) searches, and/or any other type of content search as may serve a particular implementation. For example, search engine provider subsystem 206 may provide a portal or webpage with which a user may interact to perform one or more content searches. In some examples, search engine provider subsystem 206 may be configured to facilitate user searching of content provided by media content provider subsystem 204 by way of service provider subsystem 202.

Access device 208 may be configured to facilitate access by a user to content provided by any of subsystems 202-206 and/or content stored locally by access device 208. Access device 208 may be implemented by any suitable access device, such as a set-top box device, a digital video recorder ("DVR") device, a personal computer, a mobile device (e.g., a mobile phone), a tablet computer, a personal-digital assistant device, a gaming device, a television device, and/or any other suitable computing device configured to access content.

Service provider subsystem 202, media content provider subsystem 204, search engine provider subsystem 206, and/or access device 208 may each be implemented by one or more computing devices. For example, service provider subsystem 202, media content provider subsystem 204, search engine provider subsystem 206, and/or access device 208 may be implemented by one or more server devices, access devices, and/or other computing devices.

Service provider subsystem 202, media content provider subsystem 204, search engine provider subsystem 206, and/or access device 208 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Service provider subsystem 202, media content provider subsystem 204, search engine provider subsystem 206, and/or access device 208 may communicate using any suitable network. For example, as shown in FIG. 2, service provider subsystem 202, media content provider subsystem 204, search engine provider subsystem 206, and/or access device 208 may be configured to communicate with each other by way of network 210. Network 210 may include one or more networks or types of networks capable of carrying communications and/or data signals between the components of system 100. For example, network 210 may include, but are not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In some examples, although FIG. 2 shows service provider subsystem 202, media content provider subsystem 204, search engine provider subsystem 206, and access device 208 communicatively coupled via network 210, it will be recognized that service provider subsystem 202, media content provider subsystem 204, search engine provider subsystem 206, and access device 208 may be configured to communicate one with another in any other suitable manner (e.g., via a direct connection).

In certain embodiments, system 100 may be implemented entirely by or within service provider subsystem 202, media content provider subsystem 204, search engine provider subsystem 206, or access device 208. For example, system 100 may be implemented entirely by service provider subsystem 202, by media content provider subsystem 204, by search engine provider subsystem 206, or by access device 208. In other embodiments, components of system 100 may be distributed across service provider subsystem 202, media content provider subsystem 204, search engine provider subsystem 206, and/or access device 208.

Figure 3:
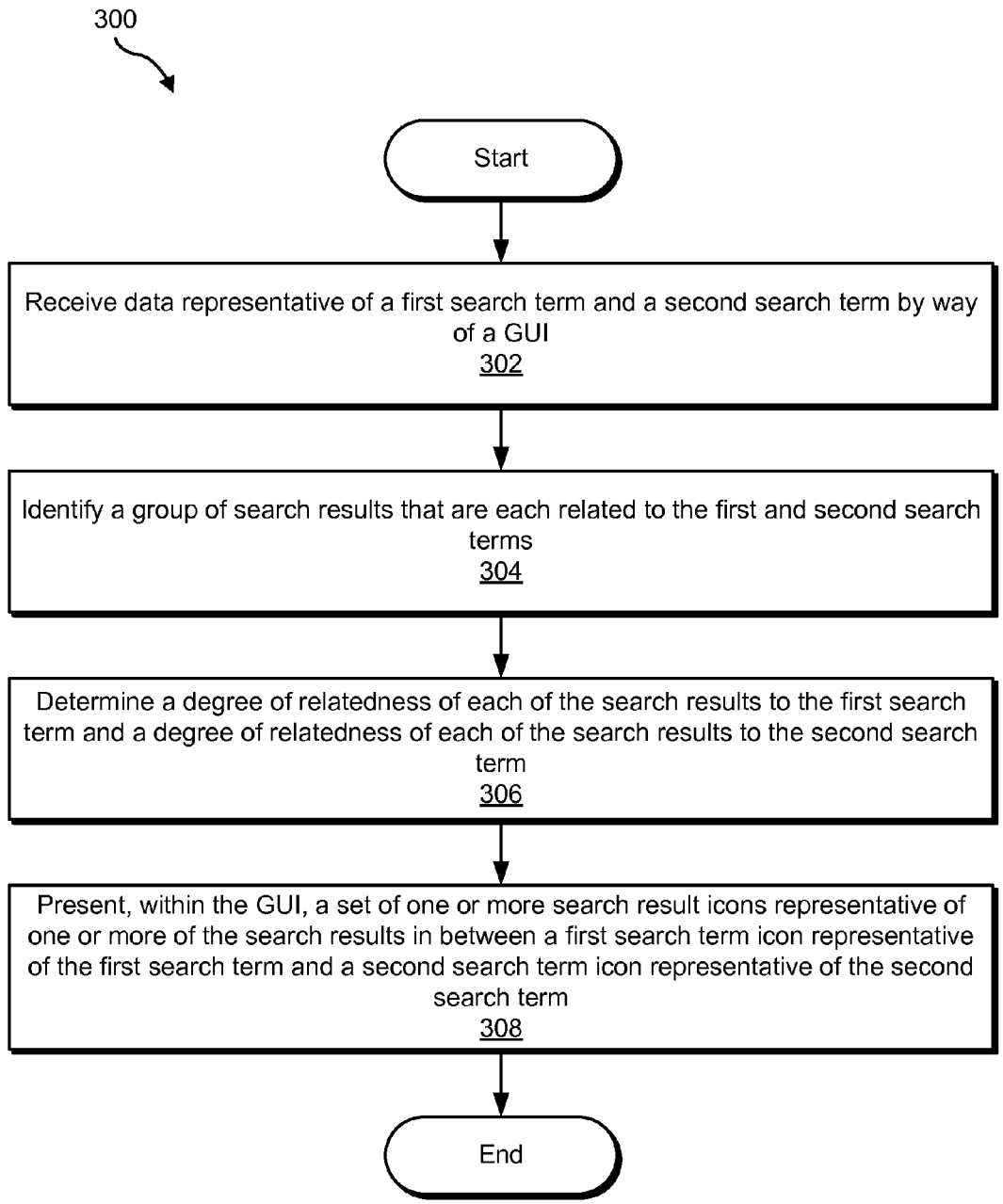
FIG. 3 illustrates an exemplary search results comparison method according to principles described herein.

FIG. 3 illustrates an exemplary search results comparison method 300 according to principles described herein. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100.

In step 302, data representative of a first search term and a second search term is received by way of a GUI. The data may be received in any of the ways described herein.

In step 304, a group of search results that are each related to the first and second search terms is identified. The search results may be identified as being related to the first and second search terms in any suitable manner.

In step 306, a degree of relatedness of each of the search results to the first search term and a degree of relatedness of each of the search results to the second search term are determined. The degrees of relatedness may be determined in any suitable manner.

In step 308, a set of one or more search result icons representative of one or more of the search results is presented within the GUI in between a first search term icon representative of the first search term and a second search term icon representative of the second search term. The one or more search icons may be presented within the GUI in any suitable manner.

Various implementations of the systems and methods described herein will now be described in connection with FIGS. 4-17. It will be recognized that the implementations illustrated in FIGS. 4-17 are merely illustrative and that they may be modified, redacted, or added to in any way as may serve a particular implementation.

Figure 4:
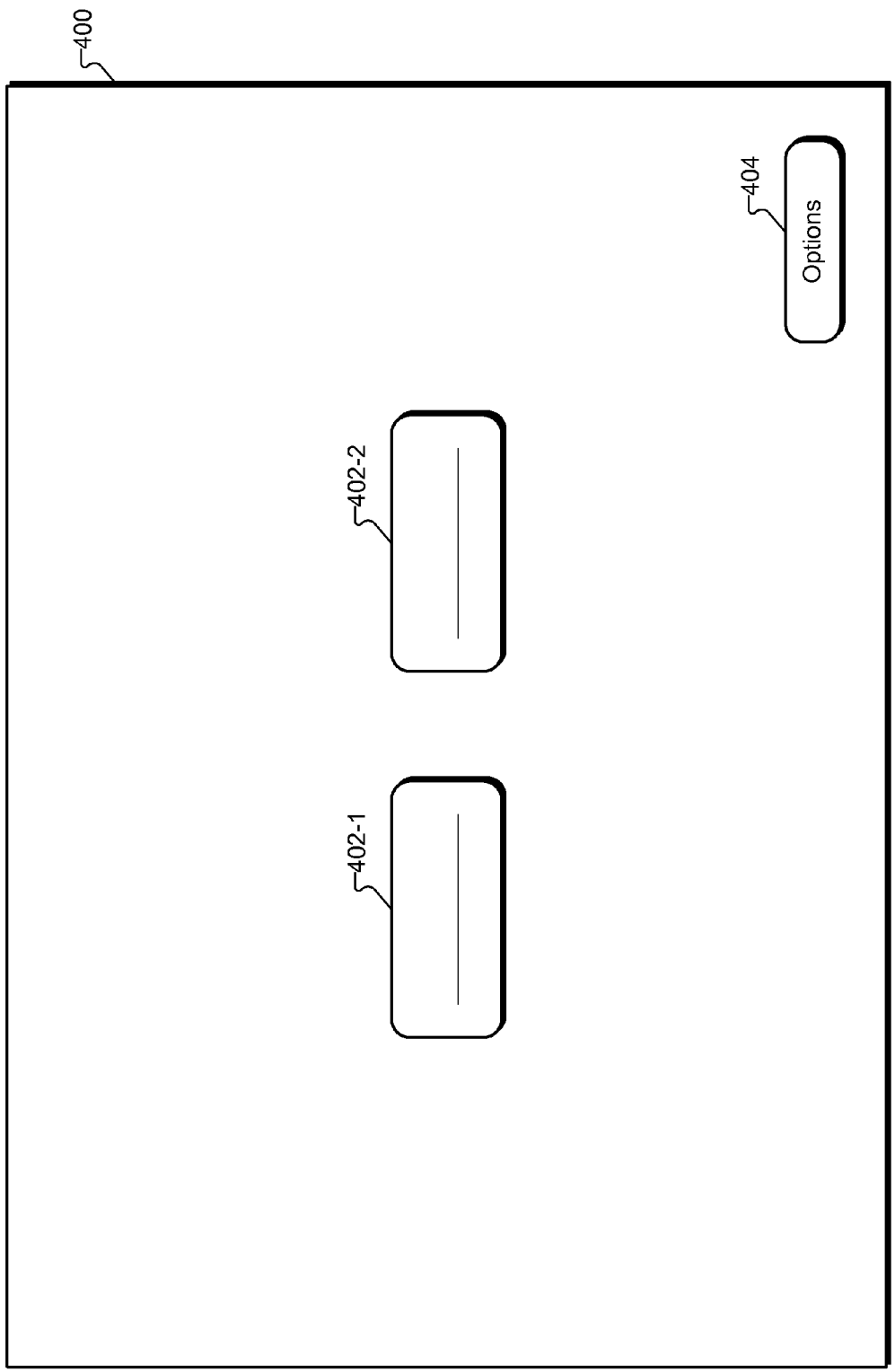
FIGS. 4-17 show various graphical user interfaces that may be presented in accordance with the systems and methods described herein.

FIG. 4 illustrates an exemplary GUI 400 that may be presented by system 100 and that may be configured to facilitate entry of various search terms by a user. As shown, GUI 400 may include a first search term entry field 402-1 into which a user may enter (e.g., type) a first search term and a second search term entry field 402-2 into which the user may enter a second search term. Any other number of search term entry fields may be presented within GUI 400 as may serve a particular implementation.

FIG. 4 also shows that an "options" button 404 may be included within GUI 400. A user may select the "options" button 404 to access and/or specify various options associated with a search to be performed by system 100 based on the search terms entered into fields 402-1 and 402-2. For example, the user may specify a number of search results that are to be presented within GUI 400 at any given time, one or more attributes upon which the search is to be based, and/or any other option associated with the search as may serve a particular implementation.

In response to receiving data representative of the first and second search terms, system 100 may identify a plurality of search results related to both the first and second search terms and determine a degree of relatedness of each of the search results to the first search term and a degree of relatedness of each of the search results to the second search term. System 100 may then graphically portray the search results in a manner that allows a user to visually compare a degree of relatedness of one or more of the search results to both the first and second search terms.

Figure 5:
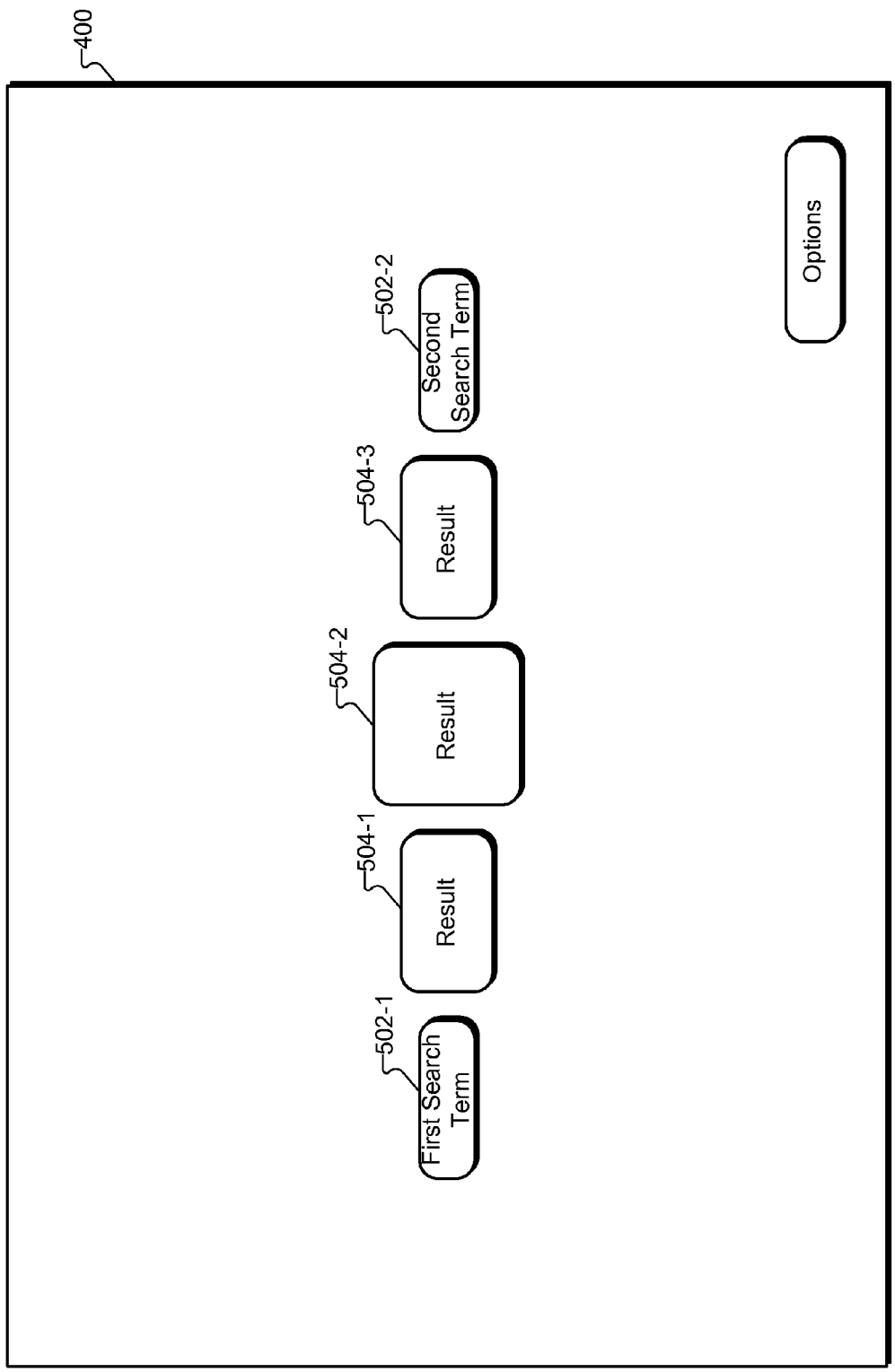

To illustrate, FIG. 5 shows that a first search term icon 502-1 representative of the first search term and a second search term icon 502-2 representative of the second search term may be presented within GUI 400. Search result icons 504 (e.g., search results 504-1 through 504-3) representative of various search results related to the first and second search terms may also be presented within GUI 400. As shown, search result icons 504 may be positioned along a substantially linear line in between first and second search term icons 502-1 and 502-2 (collectively referred to herein as "search term icons 502"). Search result icons 504 may be alternatively positioned in between search term icons 502 in any other suitable manner as may serve a particular implementation.

As used herein, a "search term icon" refers to any graphical representation of a search term that may be presented within a GUI. Likewise, a "search result icon" refers to any graphical representation of a search result that may be presented within a GUI. For example, a search term icon and a search result icon may each include a graphical object (e.g., a shape), an image (e.g., a movie poster), a text block, and/or any other graphic that may be presented within a GUI. In some examples, text (e.g., text representative of a search term or a search result) may be included within or otherwise presented in conjunction with a search term icon and/or a search result icon.

As mentioned, a position of each search result icon 504 relative to first and second search term icons 502-1 and 502-2 may be based on the degrees of relatedness of each of the search results represented by search result icons 504 to the first and second search terms. For example, a search result icon (e.g., search result icon 504-1) that is more related to the first search term than to the second search term may be positioned closer to first search term icon 502-1 than to second search term icon 502-2. Likewise, a search result icon (e.g., search result icon 504-3) representative of a particular search result that is more related to the second search term than to the first search term may be positioned closer to second search term icon 502-2 than to first search term icon 502-1.

The position of a particular search result icon (e.g., search result icon 504-1) representative of a particular search result may be further based on the search result's degrees of relatedness to the first and second search terms compared to the degrees of relatedness of the search results represented by the other search result icons (e.g., search result icons 504-2 and 504-3). For example, the search result represented by search result icon 504-1 has a higher degree of relatedness to the first search term (e.g., has more attributes in common with the first search term) than do the search results represented by search result icons 504-2 and 504-3. Hence, search result icon 504-1 is positioned relatively closer to first search term icon 502-1 than are search result icons 504-2 and 504-3.

In some examples, a search result icon representative of a particular search result that is more related to both the first and second search terms than any of the other search results identified as being related to the first and second search terms may be positioned at a location that is substantially midway between first and second search term icons 502. To illustrate, search result icon 504-2 is positioned substantially midway between first and second search term icons 502 and represents a search result that is more related to both the first and second search terms than are the search results represented by search result icons 504-1 and 504-3.

In some examples, as shown in FIG. 5, a size of a particular search result icon (e.g., search result icon 504-2) relative to the other search result icons (e.g., search result icons 504-1 and 504-3) presented within GUI 400 may be indicative of a degree of relatedness of a search result represented by the particular search result icon 504 to the first and second search terms compared to a degree of relatedness of the search results represented by the other search result icons to the first and second search terms. For example, search result icon 504-2 is relatively larger than search result icons 504-1 and 504-3, thereby indicating that the search result represented by search result icon 504-2 is more related to both the first and second search terms than are the search results represented by search result icons 504-1 and 504-3.

In some examples, any of the search result icons 504 presented within GUI 400 may be selected in order to access content associated with the search results represented by search result icons 504. For example, a user may select search result icon 504-2 to access (e.g., view, play, download, or otherwise access) content associated with the search result represented by search result icon 504-2.

In some examples, the set of search result icons 504 presented within GUI 400 may be elastic in that it may be expanded to bring in one or more additional search result icons 504 (i.e., present one or more additional search result icons 504 in between search term icons 502) or contracted to remove one or more search result icons 504 from being presented within GUI 400. The set of search result icons 504 may be expanded and/or contracted in any suitable manner. For example, a user may reposition one of the search term icons 502 (e.g., by dragging one of the search term icons 502 to the left or to the right). Alternative manners in which the set of search result icons 504 may be expanded and/or contracted will be described in more detail below.

Figure 6:
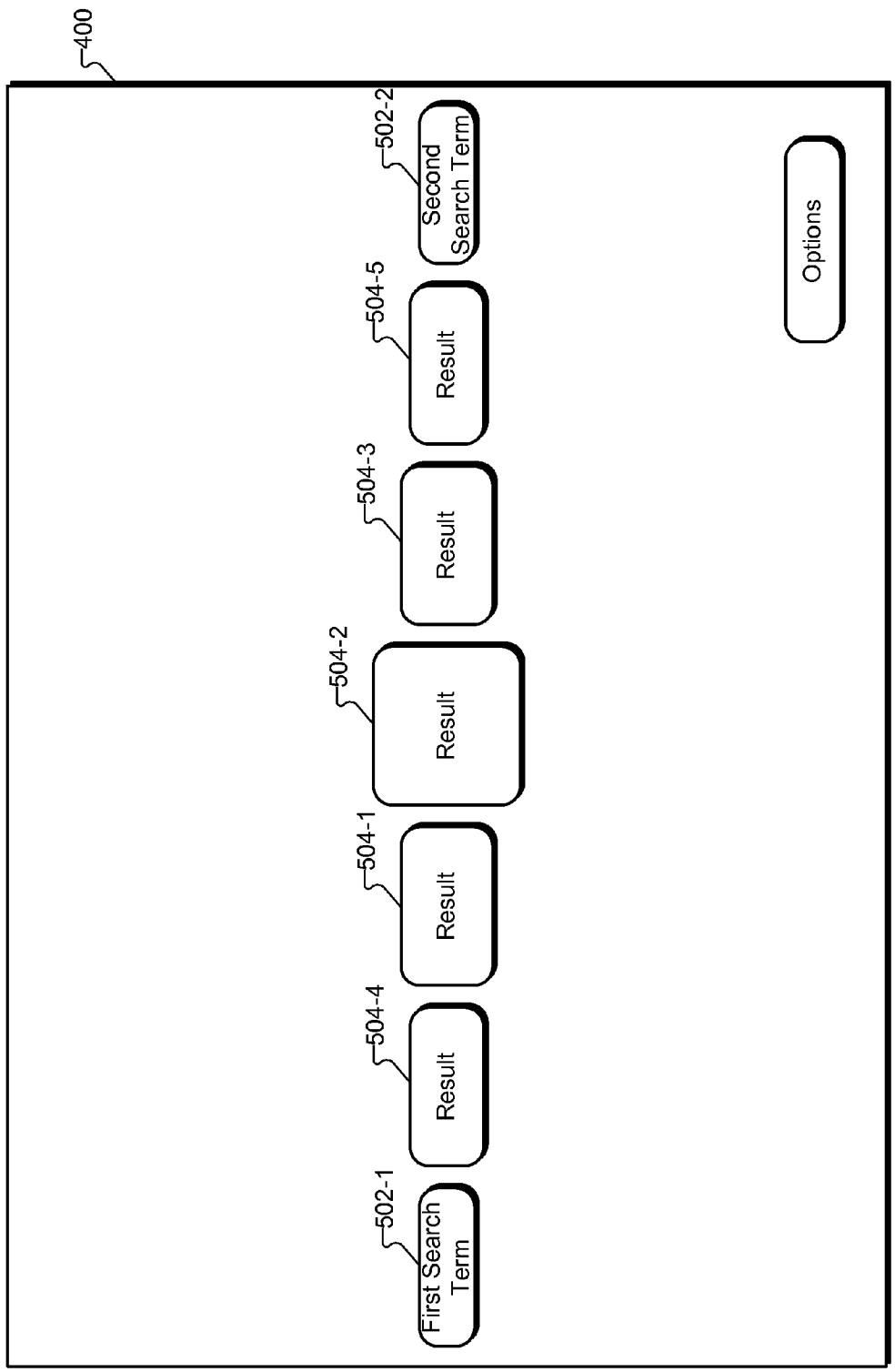

FIG. 6 shows GUI 400 after the set of search result icons 504 has been expanded. As shown, additional search result icons 504-4 and 504-5 have been brought in to the set of search result icons 504 presented in between search term icons 502. As indicated by the position of search result icon 504-4, the search result represented by search result icon 504-4 has a relatively high degree of relatedness to the first search term. Likewise, as indicated by the position of search result icon 504-5, the search result represented by search result icon 504-5 has a relatively high degree of relatedness to the second search term.

It will be recognized that the set of search result icons 504 may be expanded to bring in any number of additional search result icons representative of search results related to both the first and second search terms. Once search result icons representative of all of the identified search terms have been brought in to the set of search result icons 504, system 100 may prevent further expansion of the set of search result icons 504.

As mentioned, the expansion illustrated in FIG. 6 may be performed in response to a graphical repositioning of at least one of search term icons 502. For example, the expansion illustrated in FIG. 6 may be performed dynamically during a graphical repositioning of at least one of search term icons 502 (e.g., as the user drags search term icon 502-1 to the left or search term icon 502-2 to the right within GUI 400).

As shown in FIG. 6, an equal number of search term icons may be brought in on either side of the centrally located search result icon 504-2 as the set of search term icons 504 is expanded. This type of expansion may be referred to as "balanced expansion."

Figure 7:
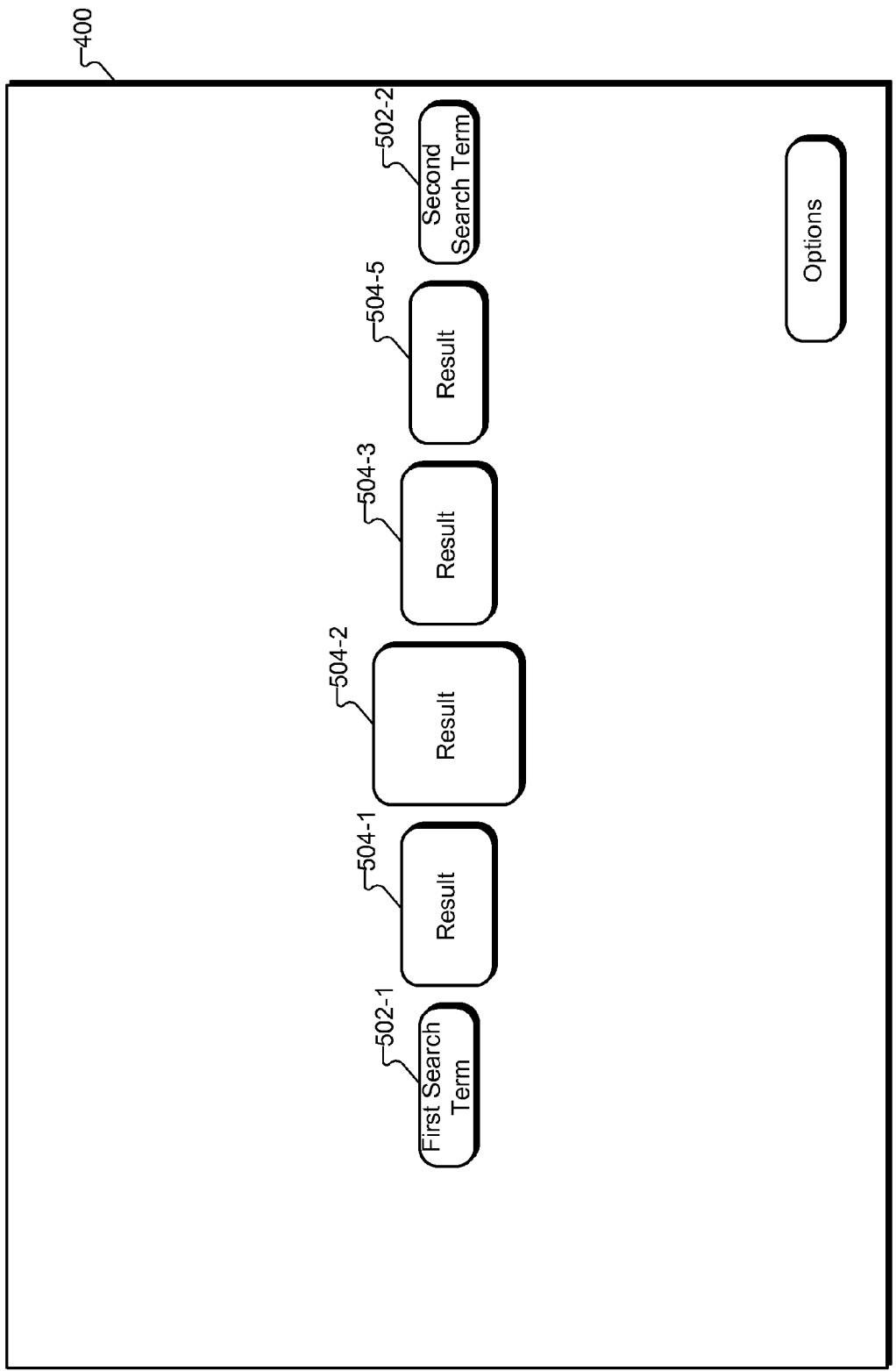

Alternatively, repositioning of one of the search term icons 502 may result in "imbalanced expansion" wherein more search term icons are brought in on one side of the centrally located search result icon 504-2 than on the other as the set of search term icons 504 is expanded. To illustrate, FIG. 7 shows that as second search term icon 502-2 is dragged to the right, only search result icon 504-5 (and not search result icon 504-4) may brought in to the set of search term icons 504. Imbalanced expansion may be desirable in situations where a user is more interested in seeing results that are more like one of the search terms (e.g., the second search term) than the other search term (e.g., the first search term). In some examples, the user may specify which type of expansion is performed by system 100 in response to a repositioning of a search term icon in any suitable manner as may serve a particular implementation.

Figure 8:
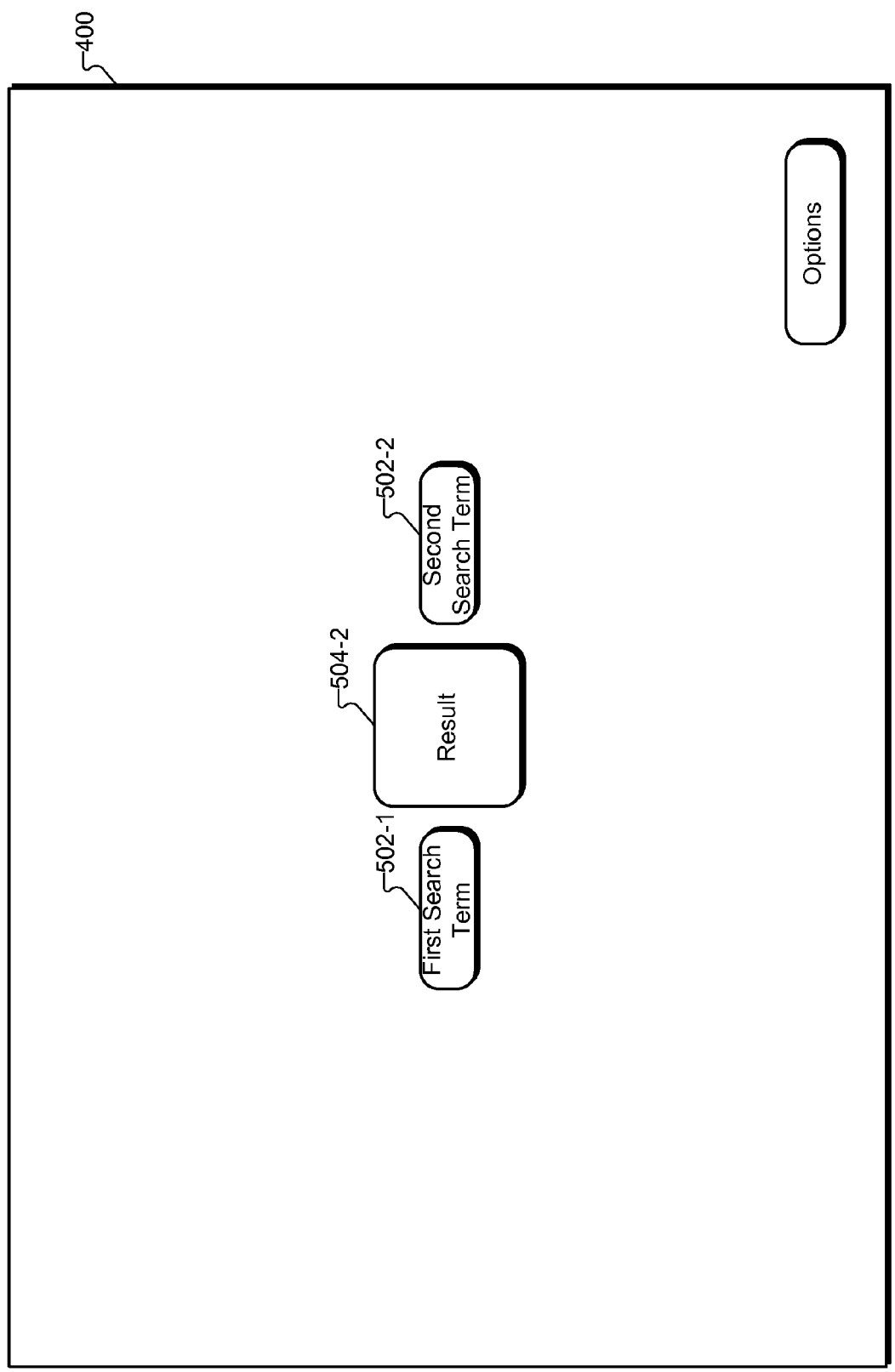

FIG. 8 shows GUI 400 after the set of search result icons 504 has been contracted to include only a single search result icon 504-2. By contracting the set of search result icons 504 presented in between search term icons 502, a user may readily identify search results that are most related to the first and second search terms.

The contraction illustrated in FIG. 8 may be performed in response to a graphical repositioning of at least one of search term icons 502. For example, the expansion illustrated in FIG. 8 may be performed dynamically during a graphical repositioning of at least one of search term icons 502 (e.g., as the user drags search term icon 502-1 to the right and/or search term icon 502-2 to the left). The contraction may be balanced or imbalanced as may serve a particular implementation.

Figure 9:
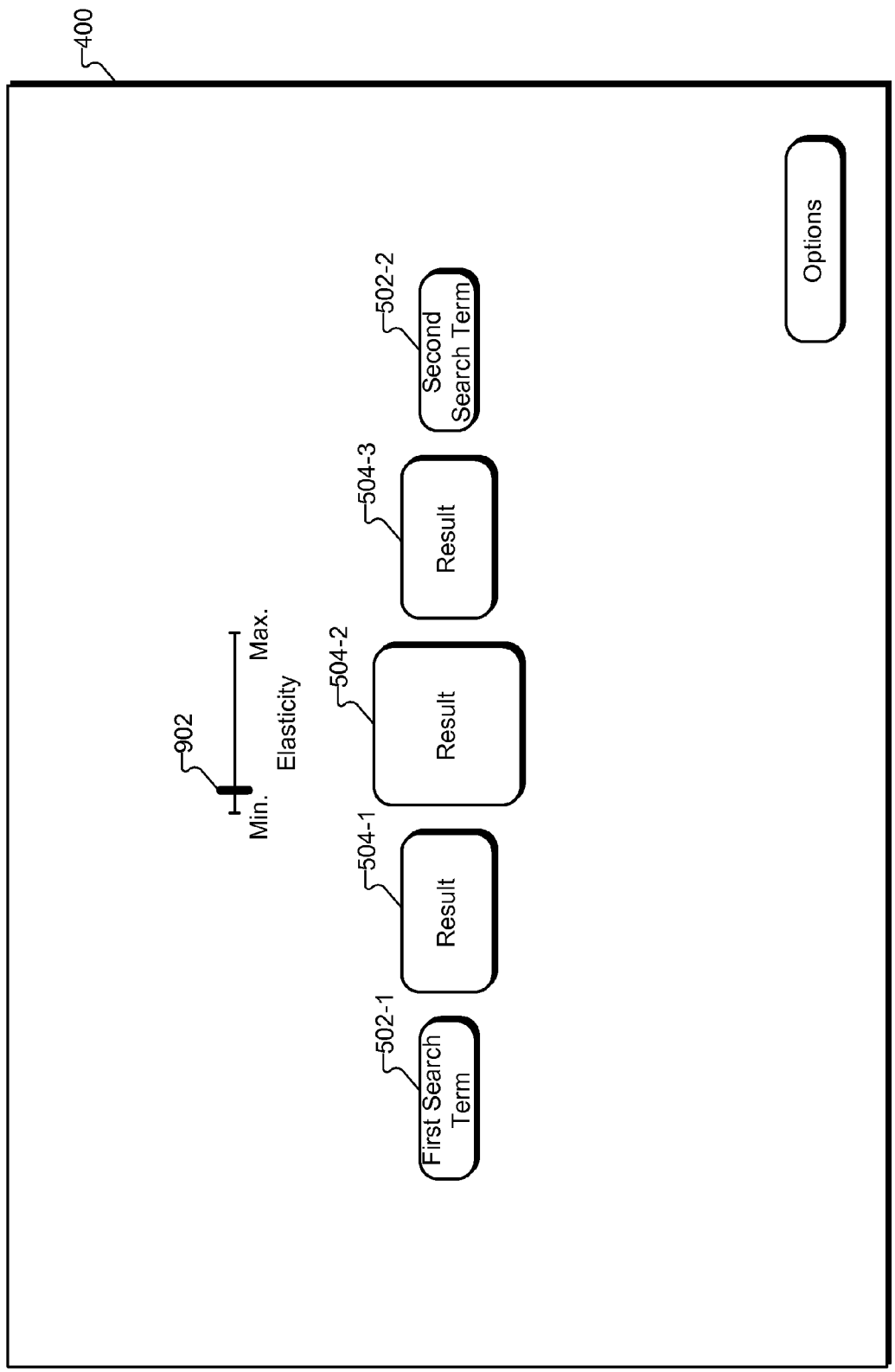

As illustrated in FIGS. 6-8, the set of search result icons 504 may be expanded and/or contracted by repositioning one or more of search term icons 502. Additionally or alternatively, the set of search result icons 504 may be expanded and/or contracted in any other suitable manner. For example, FIG. 9 shows that a graphical representation of a slider bar 902 may be presented within GUI 400. A user may interact with slider bar 902 (e.g., move slider bar 902 to the left or right) to adjust an elasticity of (i.e., expand and/or contract) the set of search result icons 504. It will be recognized that additional or alternative means for expanding and/or contracting the set of search result icons 504 may be used in accordance with the systems and methods described herein.

Figure 10:
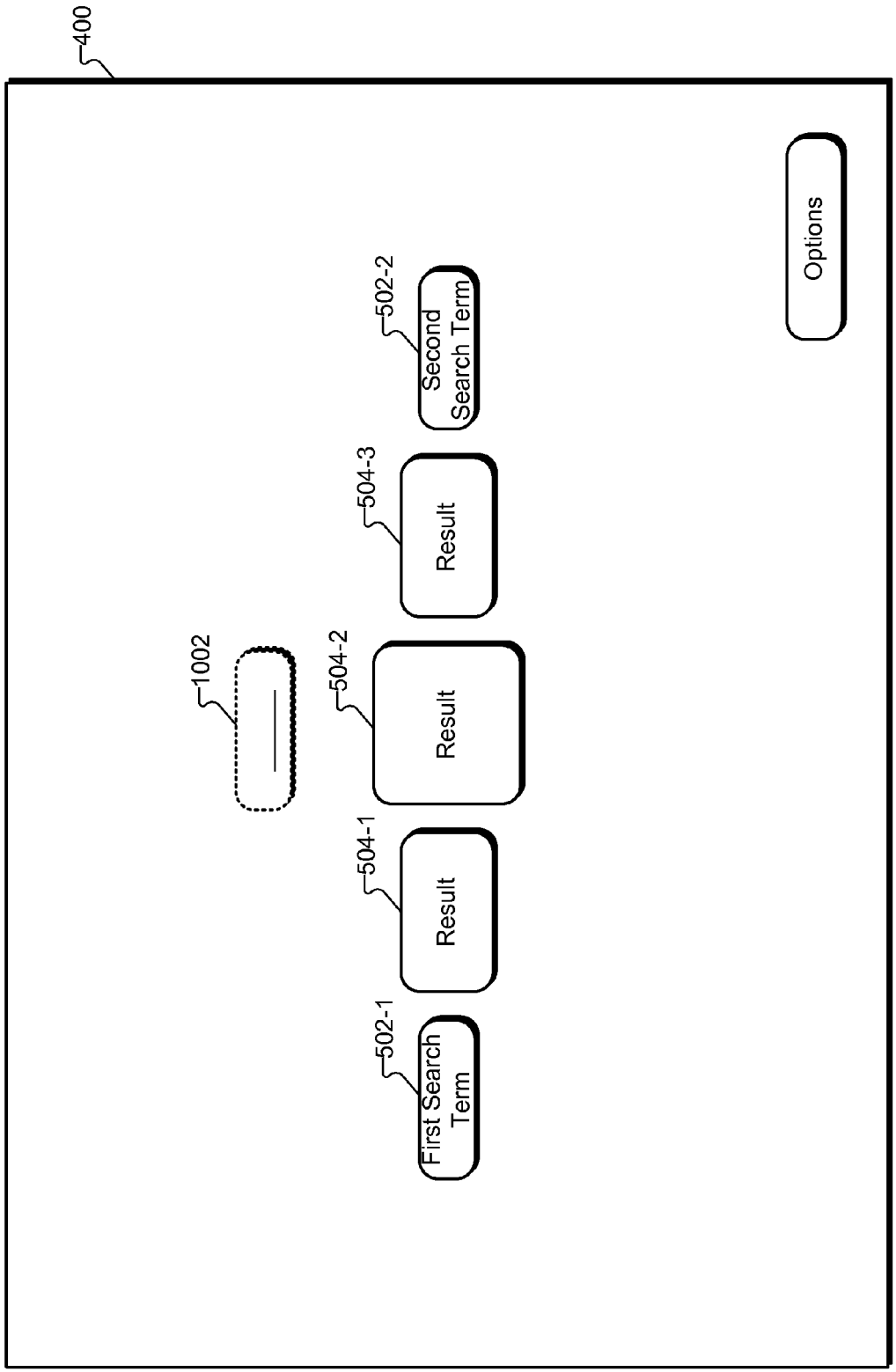

In some examples, a user may desire to expand the scope of a particular search by inputting data representative of one or more additional search terms. An additional search term may be provided in any suitable manner. To illustrate, system 100 may initially present search term icons 502 and search result icons 504 as illustrated in FIG. 5 in response to a user providing data representative of first and second search terms. Another search term entry field 1002 may then be presented within GUI 400 together with icons 502 and 504, as shown in FIG. 10. A user may enter (e.g., type) a third search term into field 1002.

Alternatively, system 100 may receive data representative of a third search term by detecting an action performed by a user with respect to a particular search result icon presented in between search term icons 502 and designating a search result represented by the particular search result icon as being the third search term. For example, a user may drag search result icon 504-1 into data field 1002 or otherwise reposition search result icon 504-1 within GUI 400. In response, system 100 may designate the search result represented by search result icon 504-1 as being the third search term.

Once system 100 has received data representative of a third search term by way of GUI 400, system 100 may process the third search term in any suitable manner. For example, system 100 may identify and present a first group of search results related to the third search term and to the first search term, a second group of search results related to the third search term and to the second search term, and/or a third group of search results related to all three search terms.

Figure 11:
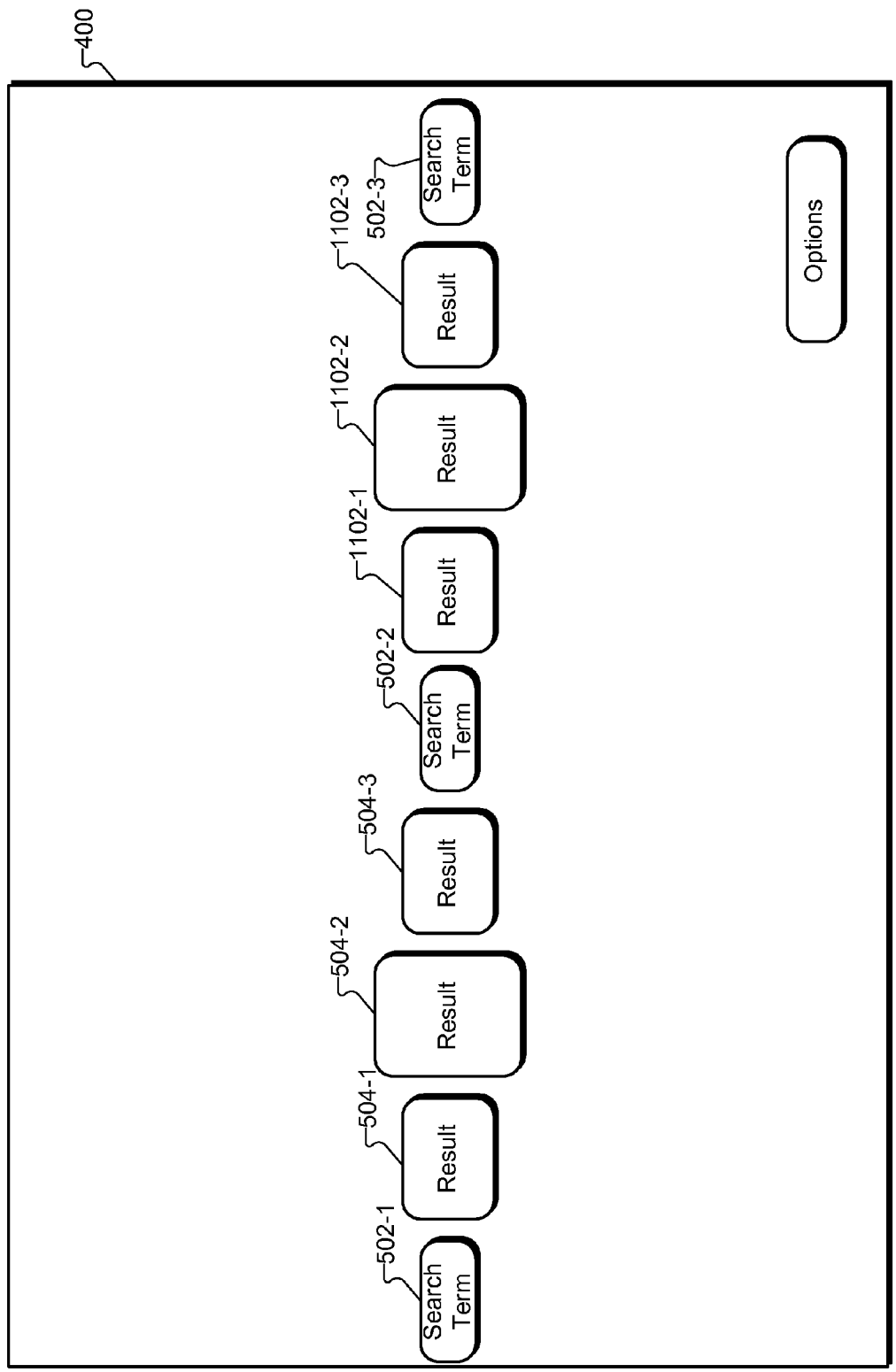

To illustrate, FIG. 11 shows that a set of search result icons 1102 (e.g., search result icons 1102-1 through 1102-3) representative of search results related to the second and third search terms may be presented within GUI 400 in between second search term icon 502-2 and a third term icon 502-3 representative of the third search term. As shown in FIG. 11, the set of search result icons 1102 may be presented concurrently with the set of search result icons 504 that are representative of search results related to the first and second search terms. In this manner, a user may readily ascertain which search results are related to the first and second search terms and which search results are related to the second and third search terms. It will be recognized that a position of each search result icon 1102 relative to second and third search term icons 502-2 and 502-3 may be based on degrees of relatedness of each of the search results represented by search result icons 1102 to the second and third search terms.

Figure 12:
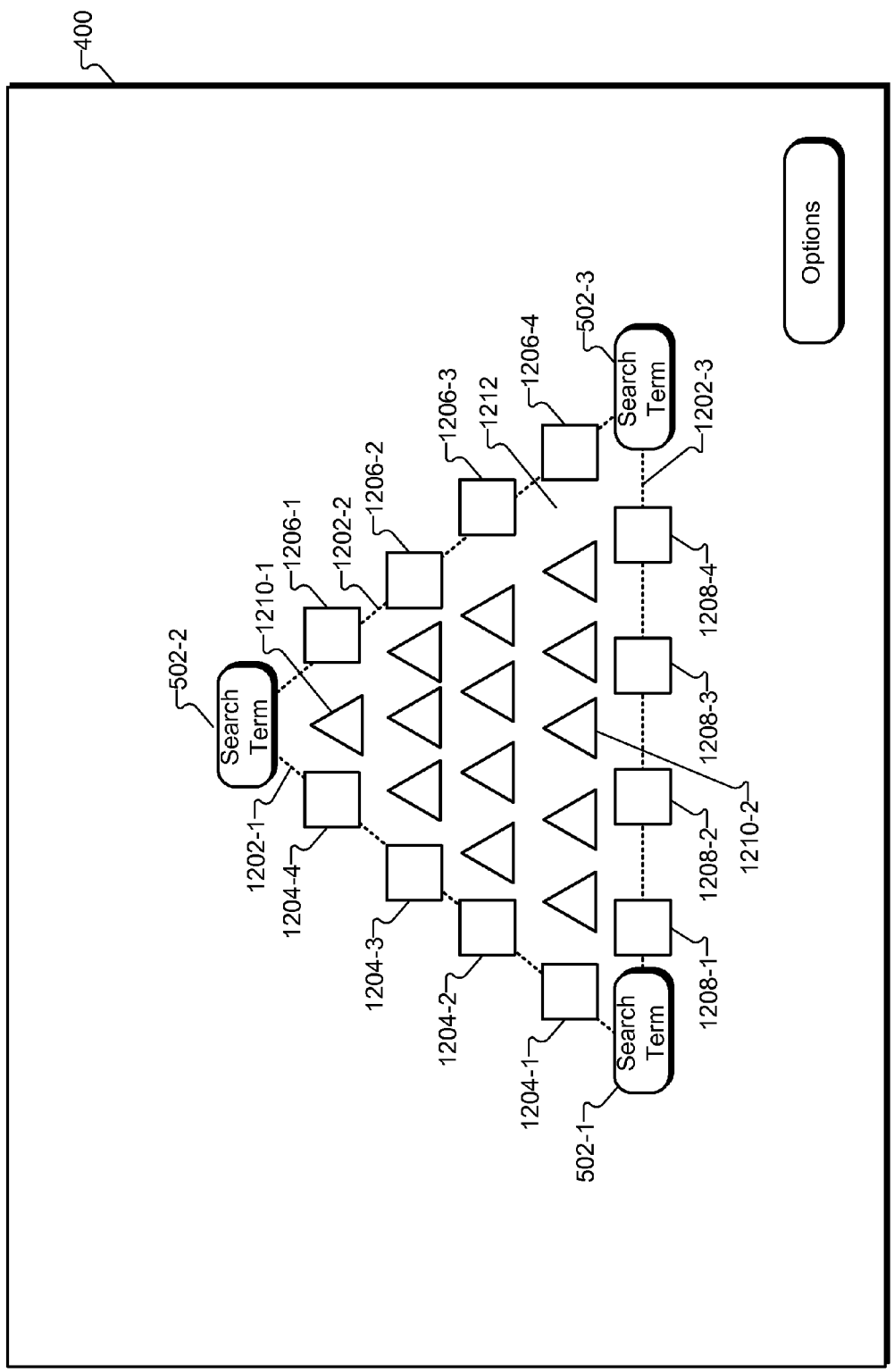

FIG. 12 illustrates an alternative embodiment wherein search results related to all three search terms may be graphically portrayed. In the example of FIG. 12, search term icons 502 are interconnected with substantially linear lines 1202 (e.g., lines 1202-1 through 1202-3). For example, first and second search term icons 502-1 and 502-2 are connected by line 1202-1, second and third search term icons 502-3 and 502-3 are connected by line 1202-2, and first and third search term icons 502-1 and 502-3 are connected by line 1202-3. Lines 1202, which may or may not be visible to a user, define a polygon (in this case, a triangle).

As shown, various groups of search results may be graphically portrayed within GUI 400. For example, a first set of search result icons 1204 (e.g., search result icons 1204-1 through 1204-4) representative of a group of search results related to the first and second search terms may be presented along line 1202-1 that connects first and second search term icons 502-1 and 502-2. A second set of search result icons 1206 (e.g., search result icons 1206-1 through 1206-4) representative of a group of search results related to the second and third search terms may be presented along line 1202-2 that connects second and third search term icons 502-2 and 502-3. A third set of search result icons 1208 (e.g., search result icons 1208-1 through 1208-4) representative of a group of search results related to the first and third search terms may be presented along line 1202-3 that connects first and third search term icons 502-1 and 502-3. A fourth set of search result icons (e.g., search result icons 1210-1 and 1210-2) represented in FIG. 12 by triangles to distinguish them from the other sets of search result icons presented within GUI 400 may be presented within an area 1212 of the polygon defined by lines 1202. The fourth set of search result icons is representative of a group of search results related to all three of the search terms. Accordingly, a user may readily ascertain from GUI 400 shown in FIG. 12 which search results are related to only the first and second search terms, which search results are related to only the second and third search terms, which search results are related to only the first and third search terms, and which search results are related to all three of the search terms.

It will be recognized that a position of each search result icon shown in FIG. 12 may be based on degrees of relatedness of each of the search results represented by the search result icons to the first, second, and/or third search terms. For example, system 100 may determine a degree of relatedness of each of the search results represented by the fourth set of search result icons to the first search term, a degree of relatedness of each of the search results represented by the fourth set of search result icons to the second search term, and a degree of relatedness of each of the search results represented by the fourth set of search result icons to the third search term. A position of each of the search result icons included in the fourth set of search result icons may then be based on the degrees of relatedness of each of the search results represented by the fourth set of search result icons to the first, second, and third search terms. For example, the position of search result icon 1210-1 indicates that the search result represented by search result icon 1210-1 is relatively more related to the second search term than is the search result represented by search result icon 1210-2.

Figure 13:
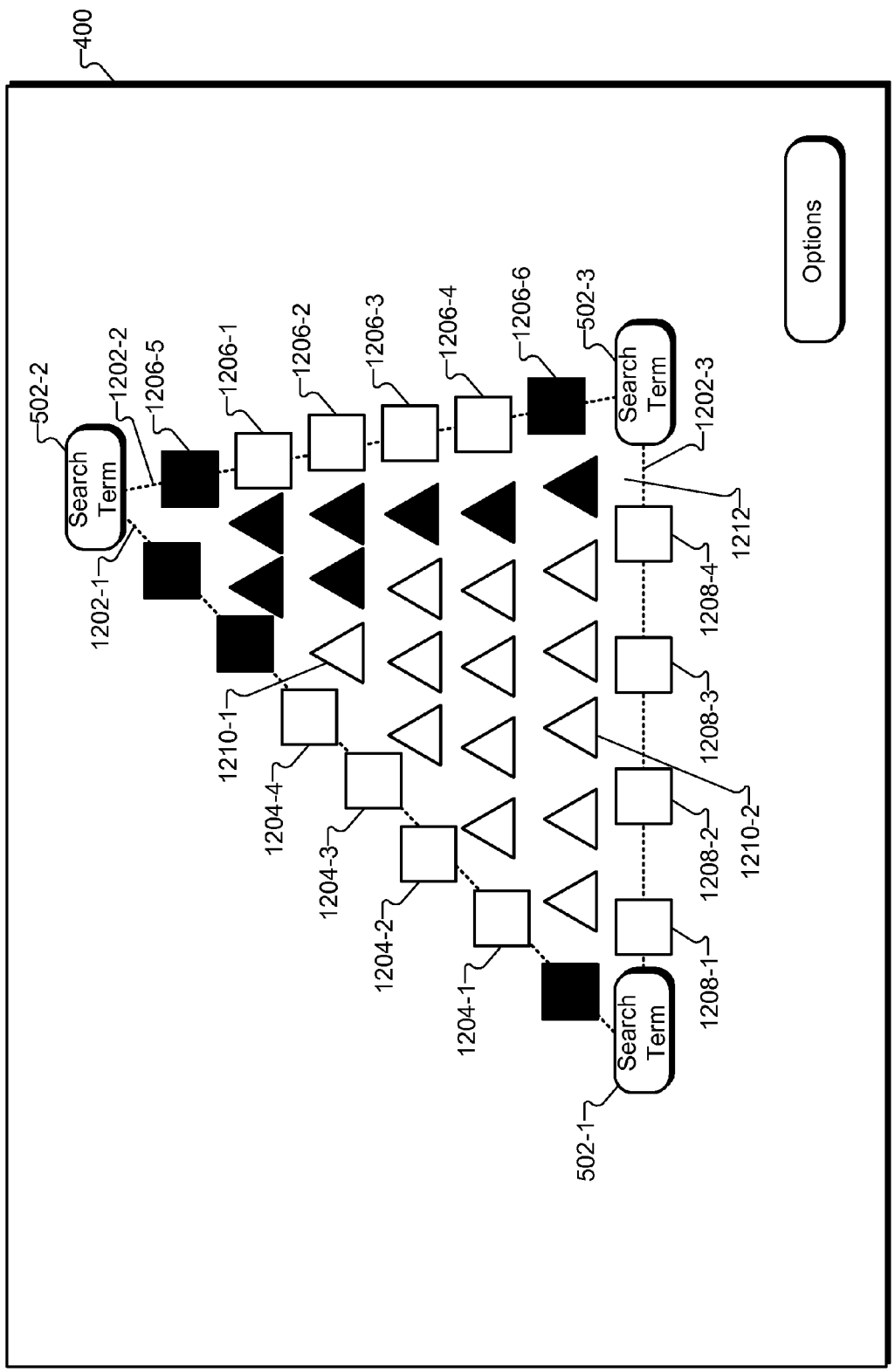

In some examples, a user may reposition one or more of the search term icons 502 to adjust a total number of search result icons presented along one or more lines 1202 and/or within area 1212. For example, FIG. 13 shows GUI 400 after search term icon 502-2 has been repositioned to lengthen lines 1202-1 and 1202-2 and expand a size of area 1212. As a result, a number of additional search result icons (i.e., the search result icons filled in black in FIG. 13) have been brought in to be presented along lines 1202-1 and 1202-2 and within area 1212. It will be recognized that one or more search term icons 502 may be alternatively repositioned in order to remove one or more search result icons from being presented within GUI 400.

Figure 14:
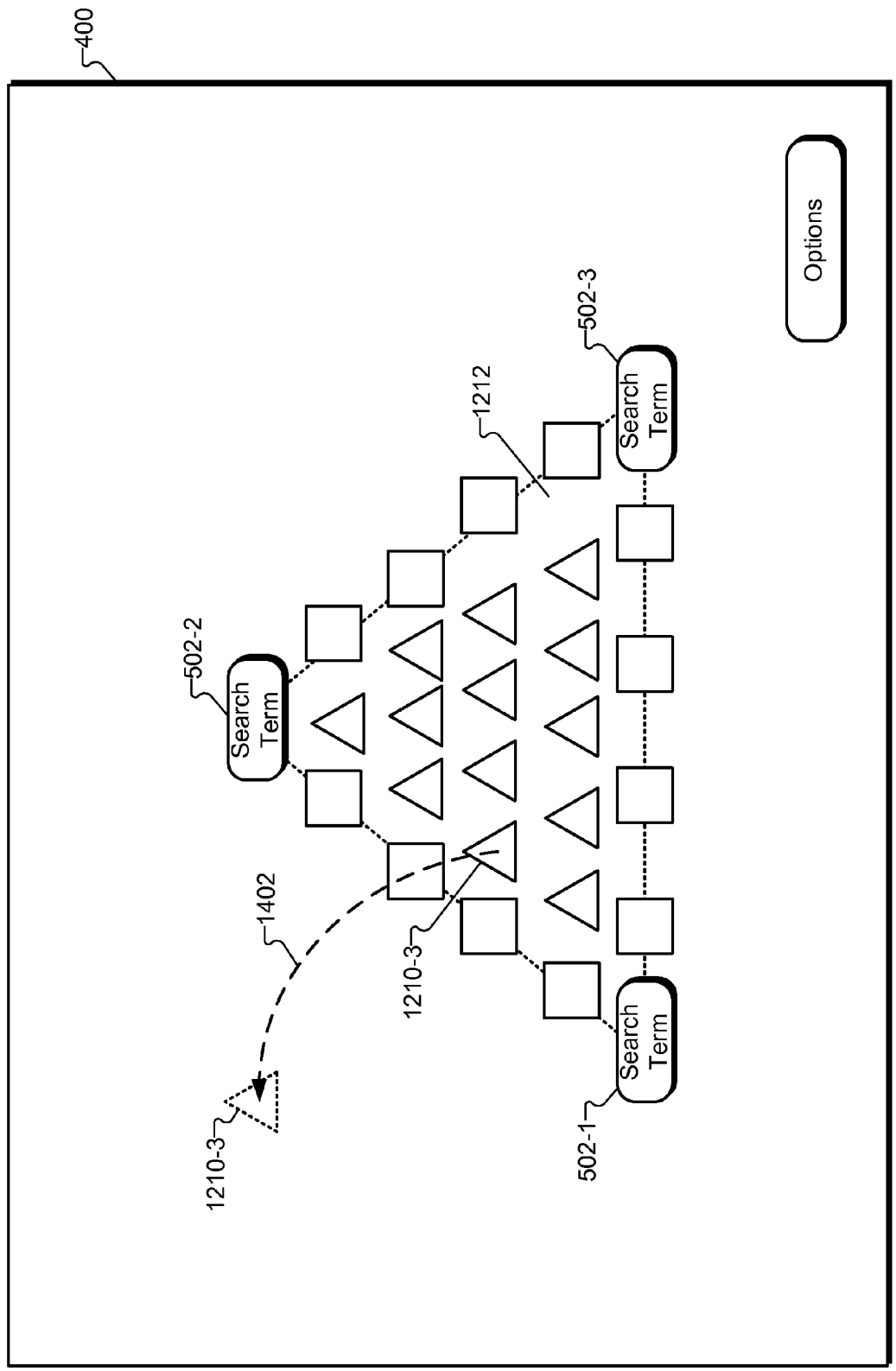
Figure 15:
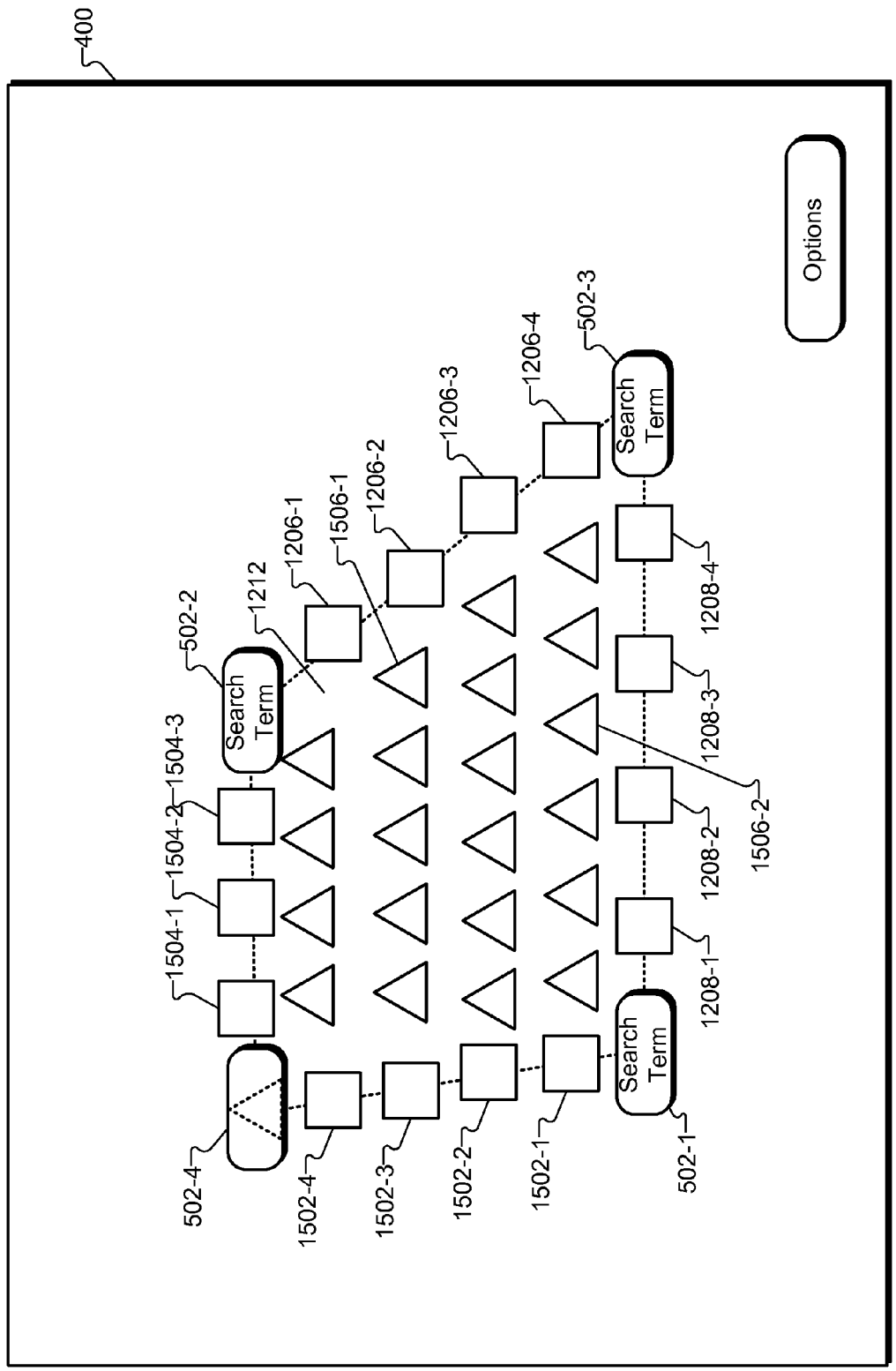

FIG. 14 shows that a user may graphically reposition (e.g., drag) a particular search result icon (e.g., search result icon 1210-3) from being located within area 1212 to being located outside area 1212. Dashed line 1402 represents a path along which search result icon 1210-3 is repositioned in GUI 400. System 100 may detect this repositioning and designate the search result represented by search result icon 1210-3 as being a fourth search term. FIG. 15 shows that a fourth search term icon 502-4 may be presented within GUI 400 to represent the newly designated fourth search term and that the polygon previously associated with search term icons 502-1 through 502-3 has been dynamically modified to be associated with search term icons 502-1 through 502-4 (i.e., defined by lines interconnecting search term icons 502-1 through 502-4). In addition, the first set of search result icons 1204 has been replaced by a fifth set of search result icons 1502 (e.g., search result icons 1502-1 through 1502-4) representative of a group of search results related to the first and fourth search terms and a sixth set of search result icons 1504 (e.g., search result icons 1504-1 through 1504-3) representative of a group of search results related to the fourth and second search terms. Likewise, the fourth set of search result icons previously presented within area 1212 has been replaced with a seventh set of search result icons (e.g., search result icons 1506-1 and 1506-2) related to all four search terms.

Figure 16:
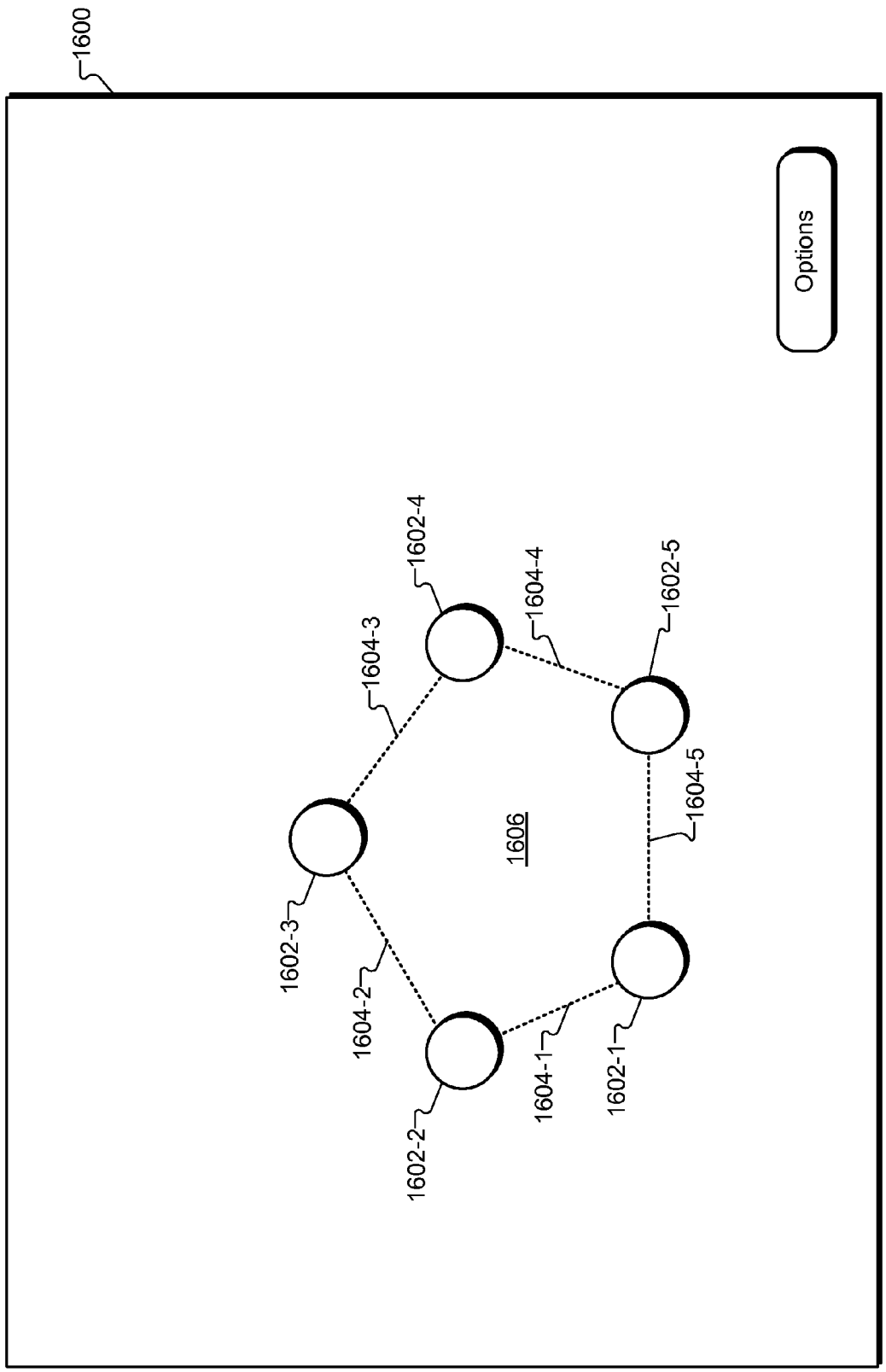

It will be recognized that a particular search may be based on any number of search terms and that, accordingly, any number of search term icons may be presented within a GUI and used to define a polygon within which search result icons representative of search results related to all of the search terms may be presented. For example, FIG. 16 shows that five search term icons 1602 (e.g., search term icons 1602-1 through 1602-5) representative of five search terms may be presented within a GUI 1600. The five search terms may be interconnected by five substantially linear lines 1604 (e.g., lines 1604-1 through 1604-5) that define a polygon having an area 1606 within which search result icons representative of search results related to all five search terms may be presented.

Figure 17:
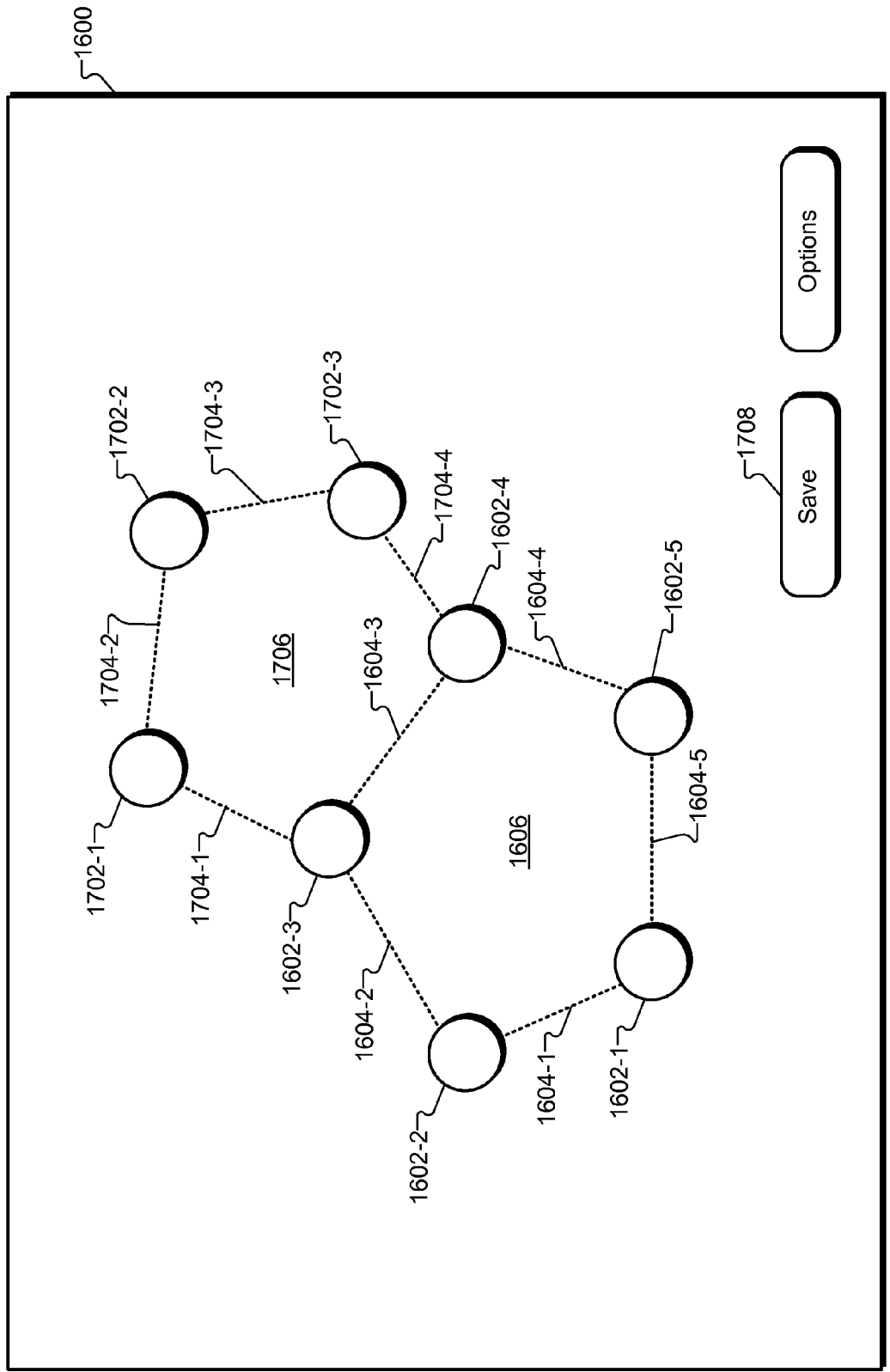

In some embodiments, system 100 may concurrently portray separate searches based on overlapping search terms. For example, FIG. 17 shows GUI 1600 after system 100 has received data representative of three additional search terms. As shown, the three additional search terms may be graphically portrayed as search term icons 1702-1 through 1702-3 (collectively "search term icons 1702"). Search term icons 1702 may be positioned such that a first substantially linear line 1704-1 connects search term icon 1702-1 and search term icon 1602-3, a second substantially linear line 1704-2 connects search term icon 1702-1 and search term icon 1702-2, a third substantially linear line 1704-3 connects search term icon 1702-2 and search term icon 1702-3, and a fourth substantially linear line 1704-4 connects search term icon 1702-3 and search term icon 1602-4. As illustrated, lines 1704 and line 1604-3 define a polygon having an area 1706 within which search result icons representative of search results related to the search terms represented by search term icons 1702-1 through 1702-3 and search term icons 1602-3 and 1602-4 may be presented.

In this manner, a user may build and display an interconnected network of searches based on any number of overlapping search terms. In some examples, the user may select a "save" button 1708 to save the interconnected network of searches for future access.

Figure 18:
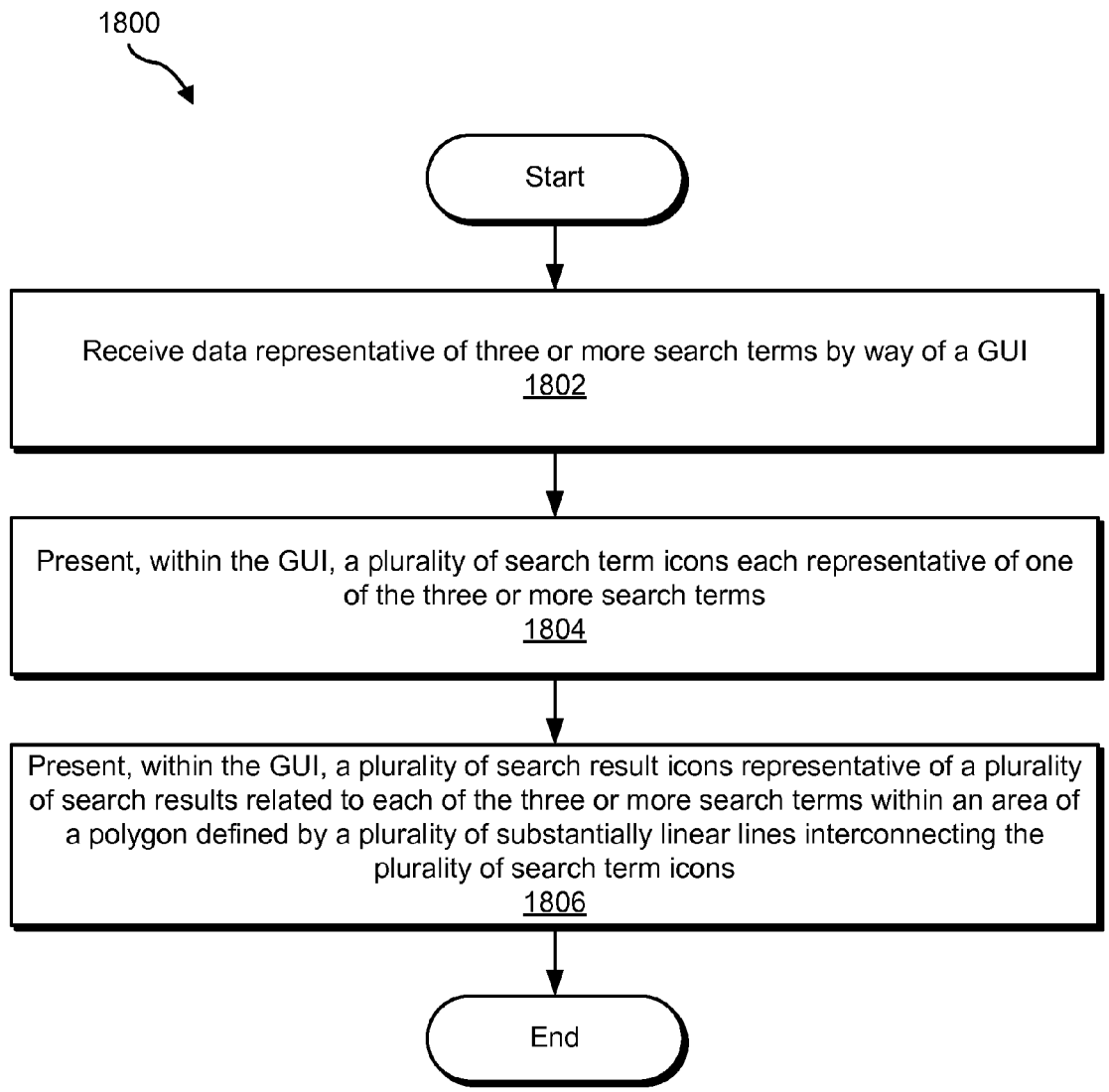
FIG. 18 illustrates another exemplary search results comparison method according to principles described herein.

FIG. 18 illustrates another exemplary search results comparison method 1800 according to principles described herein. While FIG. 18 illustrates exemplary steps according to one embodiment, other embodiments may omit, add to, reorder, and/or modify any of the steps shown in FIG. 18. One or more of the steps shown in FIG. 18 may be performed by any component or combination of components of system 100.

In step 1802, a system receives data representative of three or more search terms by way of a GUI. The data may be received in any of the ways described herein.

In step 1804, the system presents, within the GUI, a plurality of search term icons each representative of one of the three or more search terms. The search term icons may be presented in any of the ways described herein.

In step 1806, the system presents, within the GUI, a plurality of search result icons representative of a plurality of search results related to each of the three or more search terms within an area of a polygon defined by a plurality of substantially linear lines interconnecting the plurality of search term icons. Step 1806 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 19:
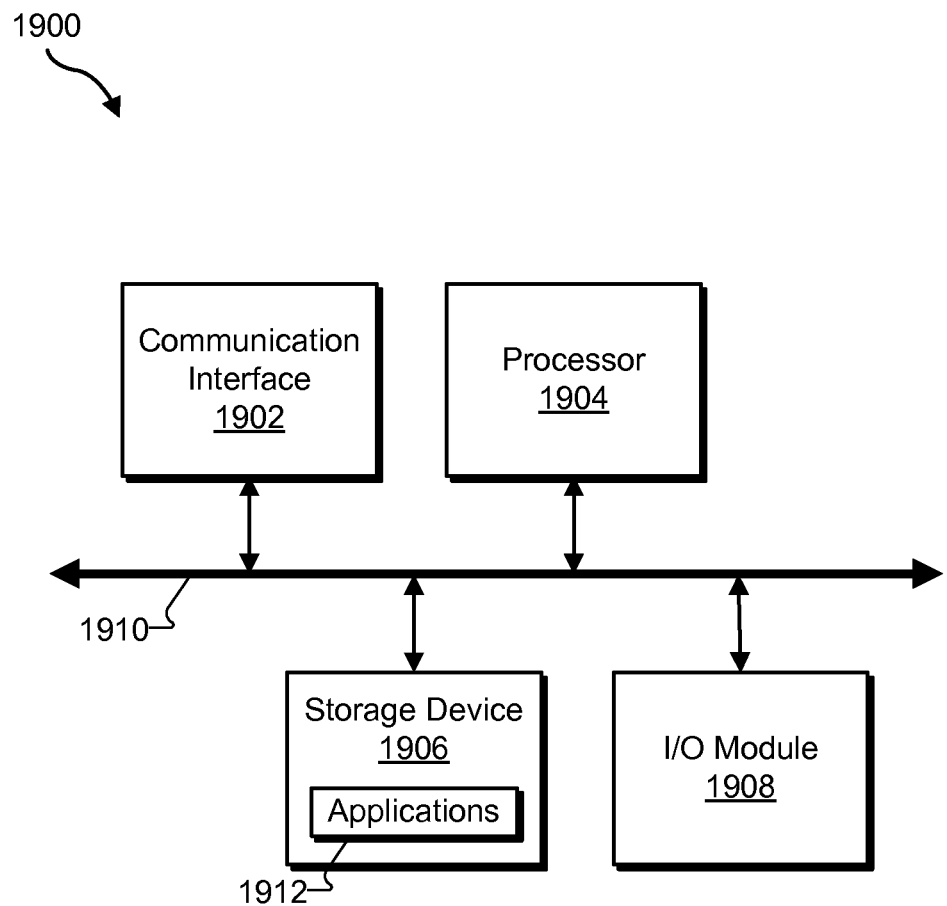
FIG. 19 illustrates an exemplary computing device according to principles described herein.

FIG. 19 illustrates an exemplary computing device 1900 that may be configured to perform one or more of the processes described herein. As shown in FIG. 19, computing device 1900 may include a communication interface 1902, a processor 1904, a storage device 1906, and an input/output ("I/O") module 1908 communicatively connected via a communication infrastructure 1910. While an exemplary computing device 1900 is shown in FIG. 19, the components illustrated in FIG. 19 are not intended to be limiting. Additional or alternative components may be used in other embodiments. Components of computing device 1900 shown in FIG. 19 will now be described in additional detail.

Communication interface 1902 may be configured to communicate with one or more computing devices. Examples of communication interface 1902 include, without limitation, a wired network interface (such as a network interface card), a wireless network interface (such as a wireless network interface card), a modem, an audio/video connection, and any other suitable interface.

Processor 1904 generally represents any type or form of processing unit capable of processing data or interpreting, executing, and/or directing execution of one or more of the instructions, processes, and/or operations described herein. Processor 1904 may direct execution of operations in accordance with one or more applications 1912 or other computer-executable instructions such as may be stored in storage device 1906 or another computer-readable medium.

Storage device 1906 may include one or more data storage media, devices, or configurations and may employ any type, form, and combination of data storage media and/or device. For example, storage device 1906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1906. For example, data representative of one or more executable applications 1912 (which may include, but are not limited to, one or more of the software applications described herein) configured to direct processor 1904 to perform any of the operations described herein may be stored within storage device 1906. In some examples, data may be arranged in one or more databases residing within storage device 1906.

I/O module 1908 may be configured to receive user input and provide user output and may include any hardware, firmware, software, or combination thereof supportive of input and output capabilities. For example, I/O module 1908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1900. For example, one or more applications 1912 residing within storage device 1906 may be configured to direct processor 1904 to perform one or more processes or functions associated with user interface facility 102, search facility 104, and/or comparison facility 106. Likewise, storage facility 108 may be implemented by or within storage device 1906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computer-implemented method comprising:
   receiving, by at least one processor included in a search results comparison system, data representative of a first search term and a second search term by way of a graphical user interface ("GUI");
   identifying, by the at least one processor included in the search results comparison system, a first group of search results that are each related to the first and second search terms;
   determining, by the at least one processor included in the search results comparison system, a degree of relatedness of each of the search results included in the first group to the first search term and a degree of relatedness of each of the search results included in the first group to the second search term; and
   presenting, by the at least one processor included in the search results comparison system within the GUI, a first set of one or more search result icons representative of one or more search results included in the first group of search results in between a first search term icon representative of the first search term and a second search term icon representative of the second search term;
   wherein a position of each of the one or more search result icons included in the first set relative to the first and second search term icons is based on the degrees of relatedness of each of the one or more search results to the first and second search terms.

2. The method of claim 1, wherein the degree of relatedness of a particular search result included in the first group of search results to the first search term is based on a number of attributes that the particular search result has in common with the first search term and the degree of relatedness of the particular search result to the second search term is based on a number of attributes that the particular search result has in common with the second search term.

3. The method of claim 2, wherein:
   the degree of relatedness of the particular search result to the first search term is relatively higher than the degree of relatedness of the particular search result to the second search term; and
   the presenting comprises positioning a search result icon representative of the particular search result relatively closer to the first search term icon than to the second search term icon.

4. The method of claim 1, wherein:
   a first search result included in the first group of search results and represented by a first search result icon has more attributes in common with the first search term than with the second search term;
   a second search result included in the first group of search results and represented by a second search result icon has more attributes in common with the second search term than with the first search term; and
   wherein the presenting comprises positioning the first search result icon relatively closer than the second search result icon to the first search term icon.

5. The method of claim 1, wherein:
   the first group of search results comprises a particular search result that has degrees of relatedness to the first and second search terms that indicate that the particular search result is more related to both the first and second search terms than all the other search results included in the first group of search results; and
   the presenting comprises positioning a search result icon representative of the particular search result at a location that is substantially midway between the first and second search term icons.

6. The method of claim 1, further comprising:
   receiving, by the search results comparison system, data representative of a request to expand the first set of one or more search result icons; and
   presenting, by the search results comparison system in response to the request and within the GUI, one or more additional search result icons representative of one or more additional search results included in the first group of search results together with the one or more search result icons in between the first and second search term icons.

7. The method of claim 6, wherein:
the receiving of data representative of the request to expand the first set of one or more search result icons comprises detecting a graphical repositioning of at least one of the first and second search term icons within the GUI by a user; and
the presenting of the one or more additional search result icons is performed dynamically during the graphical repositioning.

8. The method of claim 1, further comprising:
receiving, by the search results comparison system, data representative of a request to contract the first set of one or more search result icons; and
removing, by the search results comparison system in response to the request, at least one search result icon included in the one or more search result icons from being presented within the GUI.

9. The method of claim 8, wherein:
the receiving of data representative of the request to contract the first set of one or more search result icons comprises detecting a graphical repositioning of at least one of the first and second search term icons within the GUI by a user; and
the removing of the at least one search result icon is performed dynamically during the graphical repositioning.

10. The method of claim 1, further comprising:
receiving, by the search results comparison system, data representative of a third search term by way of the GUI;
identifying, by the search results comparison system, a second group of search results that are each related to the second and third search terms;
determining, by the search results comparison system, a degree of relatedness of each of the search results included in the second group to the second search term and a degree of relatedness of each of the search results included in the second group to the third search term; and
presenting, by the search results comparison system together with the first set of one or more search result icons within the GUI, a second set of one or more search result icons representative of one or more search results included in the second group of search results in between the second search term icon and a third search term icon representative of the third search term;
wherein a position of each of the one or more search result icons included in the second set relative to the second and third search term icons is based on the degrees of relatedness of each of the one or more search results included in the second group of search results to the second and third search terms.

11. The method of claim 10, further comprising:
identifying, by the search results comparison system, a third group of search results that are each related to the first and third search terms;
determining, by the search results comparison system, a degree of relatedness of each of the search results included in the third group to the first search term and a degree of relatedness of each of the search results included in the third group to the third search term; and
presenting, by the search results comparison system together with the first and second sets of one or more search result icons within the GUI, a third set of one or more search result icons representative of one or more search results included in the third group of search results in between the first search term icon and the third search term icon;
wherein a position of each of the one or more search result icons included in the third set relative to the first and third search term icons is based on the degrees of relatedness of each of the one or more search results included in the third group of search results to the first and third search terms.

12. The method of claim 11, wherein:
the first set of one or more search result icons is positioned along a first substantially linear line in between the first and second search term icons;
the second set of one or more search result icons is positioned along a second substantially linear line in between the second and third search term icons; and
the third set of one or more search result icons is positioned along a third substantially linear line in between the first and third search term icons.

13. The method of claim 12, further comprising:
identifying, by the search results comparison system, a fourth group of search results that are each related to the first, second, and third search terms; and
presenting, by the search results comparison system within an area defined by the first, second, and third lines and together with the first, second, and third sets of one or more search result icons, a fourth set of one or more search result icons representative of one or more search results included in the fourth group of search results.

14. The method of claim 13, further comprising:
determining, by the search results comparison system, a degree of relatedness of each of the search results included in the fourth group to the first search term, a degree of relatedness of each of the search results included in the fourth group to the second search term, and a degree of relatedness of each of the search results included in the fourth group to the third search term;
wherein a position of each of the one or more search result icons included in the fourth set relative to the first, second, and third search term icons is based on the degrees of relatedness of each of the one or more search results included in the fourth group of search results to the first, second, and third search terms.

15. The method of claim 13, further comprising:
detecting, by the search results comparison system, a graphical repositioning of at least one of the first, second, and third search term icons within the GUI by a user; and
adjusting, by the search results comparison system in response to the detecting of the graphical repositioning, a total number of search result icons included in the fourth set that are presented within the area defined by the first, second, and third lines.

16. The method of claim 13, further comprising:
detecting, by the search results comparison system, a graphical repositioning of a particular search result icon representative of a particular search result included in the fourth group of search results from being located within the area to being located outside the area; and
designating, by the search results comparison system, the particular search result as being a fourth search term.

17. The method of claim 10, wherein the receiving of the data representative of the third search term comprises:
detecting an action performed by a user with respect to a particular search result icon included in the first set of one or more search result icons; and
designating a search result represented by the particular search result icon as the third search term.

18. The method of claim 17, wherein the action comprises a repositioning of a search result icon representative of the particular search result within the GUI.

19. The method of claim 1, further comprising:
associating, by the search results comparison system, the first and second search terms with a particular search session; and
saving, by the search results comparison system, the particular search session for subsequent access by a user.

20. The method of claim 1, wherein the first set of one or more search result icons is positioned along a first substantially linear line in between the first and second search term icons.

21. The method of claim 1, wherein the first search term is representative of a first media content instance and the second search term is representative of a second media content instance.

22. A computer-implemented method comprising:
receiving, by at least one processor included in a search results comparison system, data representative of three or more search terms by way of a graphical user interface ("GUI");
presenting, by the at least one processor included in the search results comparison system within the GUI, a plurality of search term icons each representative of one of the three or more search terms;
presenting, by the at least one processor included in the by the search results comparison system within the GUI, a plurality of search result icons representative of a plurality of search results related to each of the three or more search terms within an area of a polygon defined by a plurality of linear lines interconnecting the plurality of search term icons;
receiving, by the at least one processor included in the search results comparison system subsequent to the presenting of the plurality of search result icons, data representative of one or more additional search terms by way of the GUI;
presenting, by the at least one processor included in the search results comparison system together with the plurality of search term icons within the GUI, one or more additional search term icons each representative of one of the one or more additional search terms; and
presenting, by the at least one processor included in the search results comparison system within the GUI, a plurality of additional search result icons representative of a plurality of additional search results related to at least two search terms included in the three or more search terms and to the one or more additional search terms within an area of an additional polygon defined by a plurality of linear lines interconnecting the search term icons representative of the at least two search terms and the one or more additional search term icons.

23. A system comprising: at least one computing device that comprises
at least one processor;
a search facility configured to direct the at least one processor to
receive data representative of a first search term and a second search term by way of a graphical user interface ("GUI"), and
identify a first group of search results that are each related to the first and second search terms; and
a comparison facility communicatively coupled to the search facility and configured to direct the at least one processor to
determine a degree of relatedness of each of the search results included in the first group to the first search term and a degree of relatedness of each of the search results included in the first group to the second search term, and
present, within the GUI, a first set of one or more search result icons representative of one or more search results included in the first group of search results in between a first search term icon representative of the first search term and a second search term icon representative of the second search term;
wherein a position of each of the one or more search result icons included in the first set relative to the first and second search term icons is based on the degrees of relatedness of each of the one or more search results to the first and second search terms.

* * * * *